(12) United States Patent
Sato et al.

(10) Patent No.: US 12,556,093 B2
(45) Date of Patent: Feb. 17, 2026

(54) SWITCHING POWER SUPPLY DEVICE, SWITCHING CONTROL DEVICE, AND VEHICLE-MOUNTED APPLIANCE

(71) Applicant: ROHM CO., LTD., Kyoto (JP)

(72) Inventors: Kosuke Sato, Kyoto (JP); Tetsuo Tateishi, Kyoto (JP); Shingo Hashiguchi, Kyoto (JP); Isao Takobe, Kyoto (JP); Yuhei Yamaguchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 18/742,699

(22) Filed: Jun. 13, 2024

(65) Prior Publication Data

US 2024/0333157 A1    Oct. 3, 2024

Related U.S. Application Data

(63) Continuation-in-part of application No. 17/615,931, filed as application No. PCT/JP2020/023307 on Jun. 12, 2020, now Pat. No. 12,040,709.

(30) Foreign Application Priority Data

Jun. 14, 2019  (JP) ................................ 2019-110968
Mar. 5, 2020   (JP) ................................ 2020-037654
Mar. 5, 2020   (JP) ................................ 2020-037659

(51) Int. Cl.
  *H02M 3/158*   (2006.01)
  *B60R 16/00*   (2006.01)
  *H02M 1/32*    (2007.01)

(52) U.S. Cl.
  CPC ........... *H02M 3/158* (2013.01); *B60R 16/005* (2013.01); *H02M 1/32* (2013.01)

(58) Field of Classification Search
  CPC . H02M 1/00; H02M 3/00; B60R 16/00; H02J 1/00
  See application file for complete search history.

(56) References Cited

U.S. PATENT DOCUMENTS 6,271,651 B1   8/2001   Stratakos et al.
6,509,721 B1   1/2003   Liebler
(Continued)

FOREIGN PATENT DOCUMENTS

CN        1407419       4/2003
JP        2010525786    7/2010
(Continued)

OTHER PUBLICATIONS

International Search Report in International Appln. No. PCT/JP2020/023307, mailed Sep. 8, 2020, 4 pages (with machine translation).

(Continued)

*Primary Examiner* — Rexford N Barnie
*Assistant Examiner* — Joseph N Inge
(74) *Attorney, Agent, or Firm* — Fish & Richardson P.C.

(57) ABSTRACT

A switching power supply device includes a first switch with a first terminal connectable to an application terminal for the input voltage and a second terminal connectable to the first terminal of an inductor; a second switch with a first terminal connectable to the first terminal of the inductor and a second terminal connectable to an application terminal for a voltage lower than the input voltage; a third switch being a GaN semiconductor element and connectable in parallel with the inductor; a detector detecting occurrence or a sign or occurrence of an overshoot in the output voltage; and a controller. The controller produces, after occurrence or a sign of occurrence of an overshoot in the output voltage is detected by the detector until settlement of the overshoot in the output (Continued)

voltage, a control state in which to keep the first and second switches off and the third switch on.

13 Claims, 46 Drawing Sheets

(56) References Cited

U.S. PATENT DOCUMENTS

| | | | | |
|---|---|---|---|---|
| 9,178,420 | B1* | 11/2015 | Hawley | H02M 3/158 |
| 10,454,370 | B2 | 10/2019 | Babazadeh et al. | |
| 10,574,132 | B2 | 2/2020 | Young | |
| 12,040,709 | B2* | 7/2024 | Sato | H02M 3/156 |
| 2008/0291711 | A1 | 11/2008 | Williams | |
| 2009/0115388 | A1 | 5/2009 | Miyazaki et al. | |
| 2014/0021930 | A1* | 1/2014 | Liu | H02M 3/1584 |
| | | | | 323/271 |
| 2018/0049283 | A1* | 2/2018 | Lee | H05B 45/38 |
| 2020/0286670 | A1* | 9/2020 | Sigamani | H01F 27/28 |
| 2022/0321007 | A1 | 10/2022 | Sato et al. | |

FOREIGN PATENT DOCUMENTS

| | | |
|---|---|---|
| JP | 2012253949 | 12/2012 |
| JP | 2015156777 | 8/2015 |

OTHER PUBLICATIONS

CN OA—The State Intellectual Property Office of People's Republic of China, Office Action in Chinese Appln. No. 202080043689.X, dated Jul. 12, 2023, 14 pages (with machine translation).

JP OA—Japanese Patent Office, Office Action in Japanese Appln. No. 2021-526172, dated Mar. 5, 2024, 13 pages (with machine translation).

JP OA—Japanese Patent Office, Office Action in Japanese Appln. No. 2021-526172, dated Jul. 30, 2024, 14 pages (with machine translation).

* cited by examiner

SWITCHING POWER SUPPLY DEVICE, SWITCHING CONTROL DEVICE, AND VEHICLE-MOUNTED APPLIANCE

CROSS-REFERENCE TO RELATED APPLICATIONS

This application is a continuation-in-part of U.S. patent application Ser. No. 17/615,931, filed Dec. 2, 2021, which is a 371 International Application of PCT/JP2020/023307 filed on Jun. 12, 2020, which claims priority under 35 U.S.C. § 119(a) on Patent Application No. 2019-110968 filed in Japan on Jun. 14, 2019, Patent Application No. 2020-037654 filed in Japan on Mar. 5, 2020, and Patent Application No. 2020-037659 filed in Japan on Mar. 5, 2020, the entire contents of which are hereby incorporated by reference.

TECHNICAL FIELD

What is disclosed herein relates to a switching power supply device that bucks (steps down) an input voltage to an output voltage, and relates also to a switching control device and a vehicle-mounted appliance.

BACKGROUND ART

In a bucking switching power supply device that bucks an input voltage to an output voltage, in general, a sharp fall in the output current causes an overshoot in the output voltage.

DESCRIPTION OF EMBODIMENTS

In the present description, a constant voltage means a voltage that is constant under ideal conditions, and in reality it can vary slightly with change in temperature or the like.

In the present description, a MOS transistor denotes a field-effect transistor in which the gate is structured to have at least three layers: "a layer of an electrical conductor or of a semiconductor such as polysilicon with a low resistance value", "an insulation layer", and "a P-type, N-type or intrinsic semiconductor layer". That is, the structure of the gate of a MOSFET is not limited to a three-layer structure composed of metal, oxide, and semiconductor layers.

<First Configuration Example of a Switching Power Supply Device>

Figure 1A:
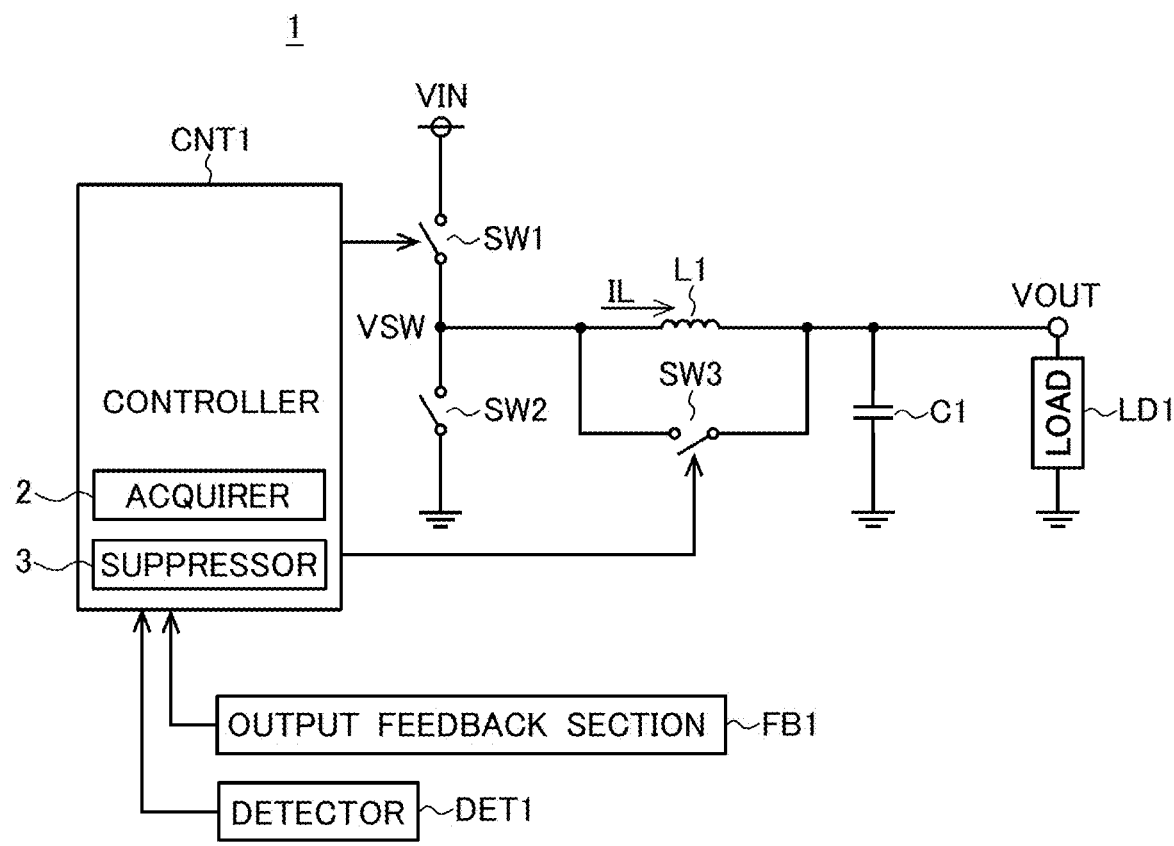
FIG. 1A is a diagram showing a first configuration example of an asynchronous rectification switching power supply device.
Figure 1B:
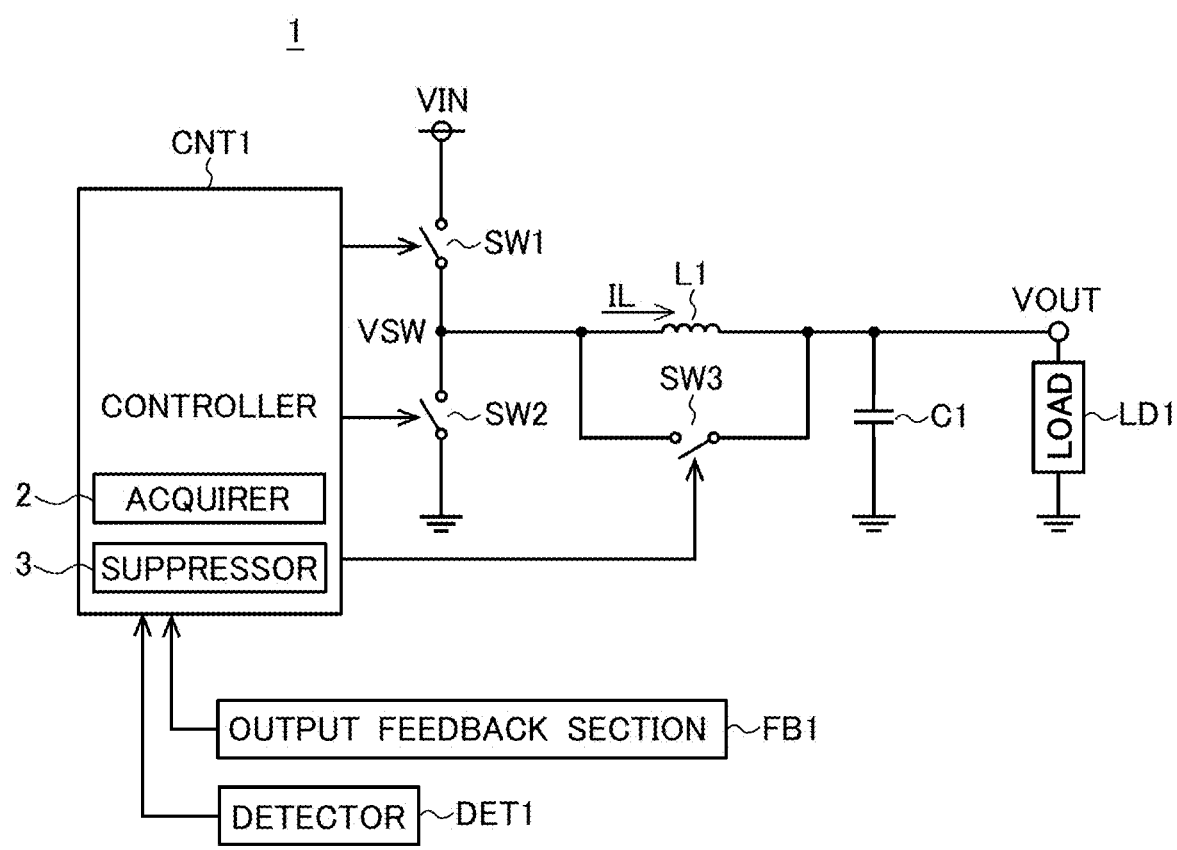
FIG. 1B is a diagram showing a first configuration example of a synchronous rectification switching power supply device.

FIGS. 1A and 1B are diagrams showing a configuration example of a switching power supply device. The switching power supply device 1 shown in FIGS. 1A and 1B is a switching power supply device that bucks (steps down) an input voltage VIN to an output voltage VOUT and includes a controller CNT1, a first to a third switch SW1 to SW3, an inductor L1, an output capacitor C1, an output feedback section FB1, and a detector DET1.

The controller CNT1 turns on and off the first to third switches SW1 to SW3 in accordance with the respective outputs of the output feedback section FB1 and the detector DET1. In other words, the controller CNT1 is a switching control device that turns on and off the first to third switches SW1 to SW3. The controller CNT1 includes an acquirer 2 that acquires the detection result from the detector DET1 and a suppressor 3 that, based on the detection result from the detector DET1 acquired by the acquirer 2, turns on and off the first switch SW1, the second switch SW2, and the third switch SW3 to suppress an overshoot in the output voltage VOUT.

For example, when the detector DET1 detects occurrence of an overshoot in the output voltage VOUT, the suppressor 3 turns the first and second switches SW1 and SW2 off and the third switch SW3 on to suppress the overshoot in the output voltage VOUT. For another example, after the detector DET1 detects occurrence of an overshoot in the output voltage VOUT until the detector DET1 detects settlement of the overshoot in the output voltage VOUT, the suppressor 3 keeps the first and second switches SW1 and SW2 off and turns the third switch SW3 on and off at a fixed period to suppress the overshoot in the output voltage VOUT.

The acquirer 2 and the suppressor 3 may each be achieved on a software basis or with hardware circuits, or may be achieved through coordinated operation of software and hardware.

The first switch SW1 is configured such that its first terminal is connectable to an application terminal for the input voltage VIN and that its second terminal is connectable to the first terminal of the inductor L1. The first switch SW1 conducts and cuts off the current path from the application terminal for the input voltage VIN to the inductor L1. As the first switch SW1, for example, a P-channel MOS transistor or an N-channel MOS transistor can be used. For example, with an N-channel MOS transistor used as the first switch SW1, a bootstrap circuit or the like may be provided in the switching power supply device 1 so as to generate a voltage higher than the input voltage VIN.

The second switch SW2 is configured such that its first terminal is connectable to the first terminal of the inductor L1 and to the second terminal of the first switch SW1, and that its second terminal is connectable to an application terminal for the ground potential. The second switch SW2 conducts and cuts off the current path from the application terminal for the ground potential to the inductor L1. In a modified version of the configuration example under discussion, the second switch SW2 may be configured such that its second terminal is connectable to an application terminal for a voltage that is lower than the input voltage VIN but other than the ground potential. As the second switch SW2, for example, a diode or an N-channel MOS transistor can be used.

For example, with a diode used as the second switch SW2, the switching power supply device 1 acts as an asynchronous rectification switching power supply device as shown in FIG. 1A.

When the switching power supply device 1 acts as an asynchronous rectification switching power supply device, the controller CNT1 controls the bias voltage applied to the switch SW2 (diode) by turning the switch SW1 on and off. Whether the switch SW2 (diode) is on or off is determined by the bias voltage applied to the switch SW2 (diode); thus, the controller CNT1 turns the switch SW2 (diode) on and off indirectly.

For example, with an N-channel MOS transistor used as the second switch SW2, the switching power supply device 1 acts as a synchronous rectification switching power supply device as shown in FIG. 1B. When the switching power supply device 1 acts as a synchronous rectification switching power supply device, the switching power supply device 1 may be configured to operate in a current continuous mode under a light load or may be configured to have a reverse current prevention function and operate in a current discontinuous mode under a light load.

Through the switching operation by the first and second switches SW1 and SW2, a pulsating switching voltage VSW is generated at the connection node between the first and second switches SW1 and SW2. The inductor L1 and the output capacitor C1 smooth the pulsating switching voltage VSW to generate the output voltage VOUT and feeds it to an application terminal for the output voltage VOUT. To the application terminal for the output voltage VOUT, a load LD1 is connected, and to the load LD1, the output voltage VOUT is fed.

Figure 1C:
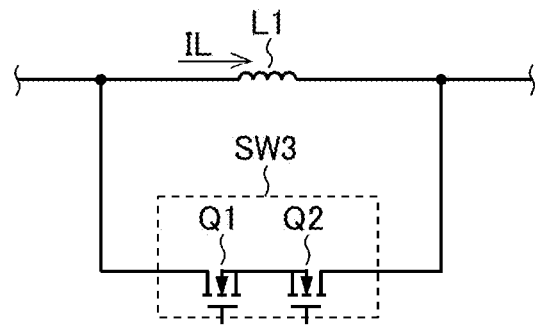
FIG. 1C is a diagram showing a configuration example of a third switch.
Figure 1D:
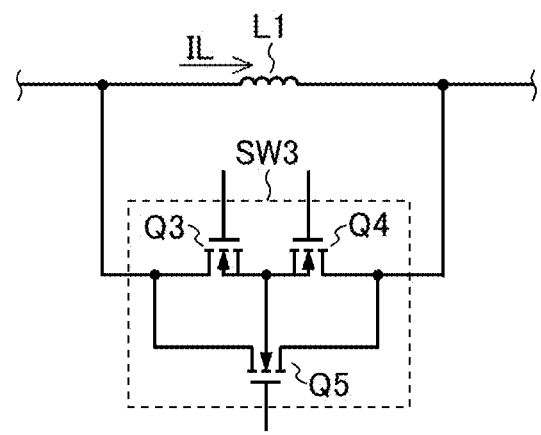
FIG. 1D is a diagram showing another configuration example of the third switch.
Figure 1E:
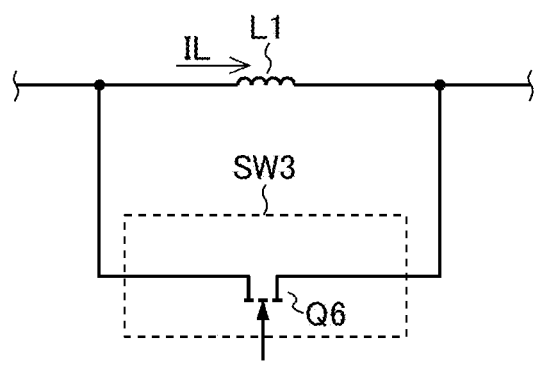
FIG. 1E is a diagram showing yet another configuration example of the third switch.

The third switch SW3 is configured such that its first terminal is connectable to the first terminal of the inductor L1, to the second terminal of the first switch SW1, and to the first terminal of the second switch SW2, and that its second terminal is connectable to the second terminal of the inductor L1. In other words, the third switch SW3 is connected in parallel with the inductor L1. As the third switch SW3, for example, an N-channel MOS transistor can be used. The third switch SW3 may be formed with a plurality of elements. A third switch SW3 formed with a plurality of elements can be, for example, a third switch SW3 as shown in FIG. 1C including two N-channel MOS transistors Q1 and Q2 of which the back gates are connected together, or a third switch as shown in FIG. 1D including three N-channel MOS transistors Q3 to Q5 of which the back gates are connected together. It is preferable that the third switch SW3 be a GaN semiconductor element Q6 as shown in FIG. 1E. Unlike a Si semiconductor element, a GaN semiconductor element Q6 does not have a parasitic diode (body diode); it can thus reduce to a higher degree the inductor current IL regenerated in the closed circuit including the inductor L1 and the third switch SW3 in a second state STATE2 as will be described later, and this helps quickly settle an overshoot in the output voltage VOUT.

The output feedback section FB1 generates and outputs a feedback signal in accordance with the output voltage VOUT. As the output feedback section FB1, for example, a resistance voltage divider circuit can be used that divides the output voltage VOUT with resistors to generate the feedback signal. For another example, the output feedback section FB1 may be configured to receive the output voltage VOUT and output it as it is as a feedback signal. The output feedback section FB1 may be configured to generate and output, in addition to a feedback signal in accordance with the output voltage VOUT, also a feedback signal in accordance with the current that passes through the inductor L1 (hereinafter referred to as the "inductor current IL"). Configuring the output feedback section FB1 to additionally generate a feedback signal in accordance with the inductor current IL makes current mode control possible.

Figure 2:
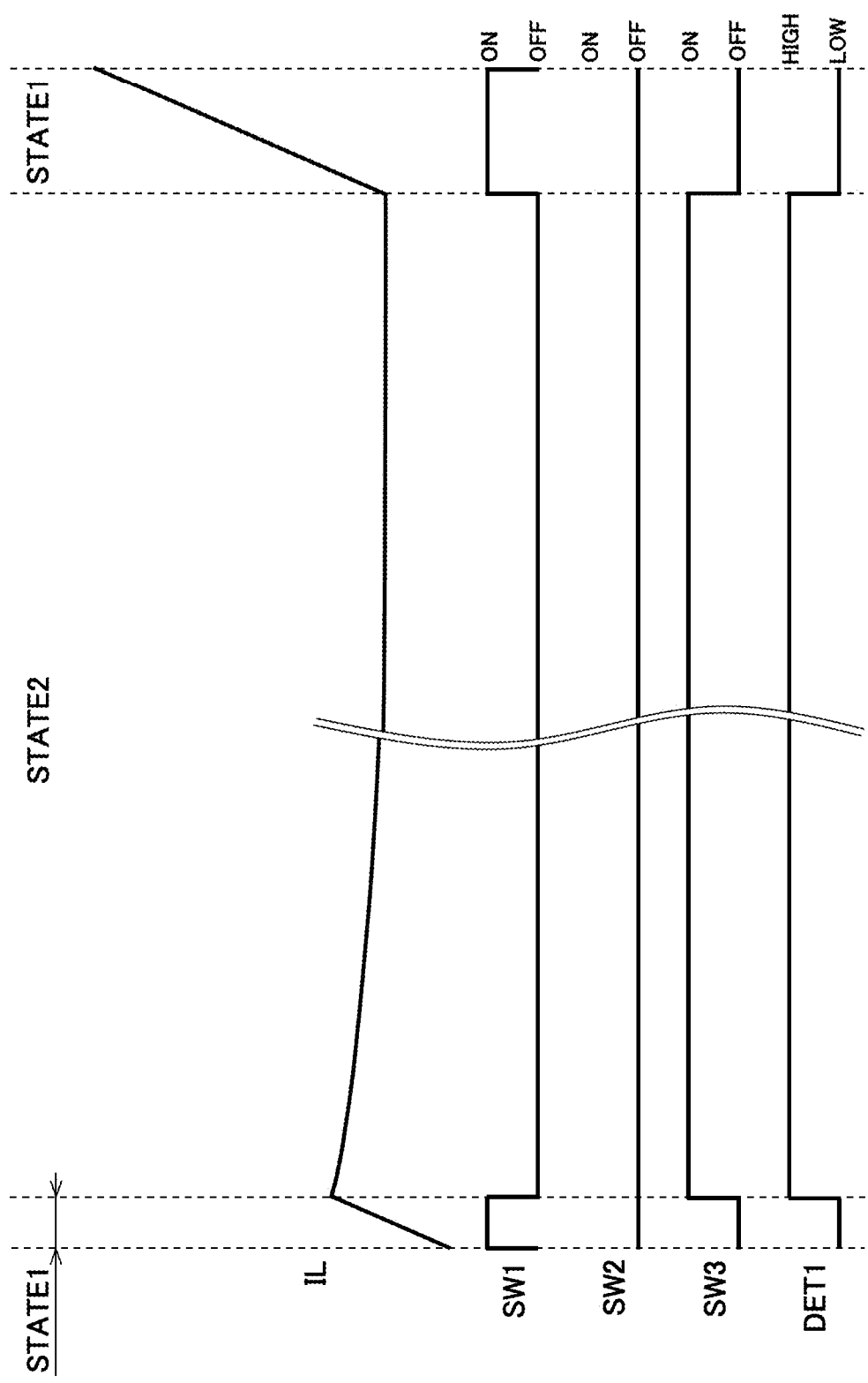
FIG. 2 is a time chart showing a first example of operation of the switching power supply device according to the first configuration example on occurrence of an overshoot in an output voltage.

The detector DET1 detects occurrence and settlement of an overshoot in the output voltage VOUT. As the detector DET1, for example, a comparator can be used that receives the output voltage VOUT at its non-inverting input terminal and receives a constant voltage (a voltage higher than the target value of the output voltage VOUT) at its inverting input terminal. When an overshoot occurs in the output voltage VOUT, the comparator switches its output signal from low level to high level. When the overshoot in the output voltage VOUT settles down, the comparator switches its output signal from high level to low level. FIG. 2 referred to later shows the output signal in this example.

A configuration is also possible where the comparator receives, instead of the output voltage VOUT, a division voltage of the output voltage VOUT at its non-inverting input terminal and receives, instead of the constant voltage, a division voltage of the constant voltage at its inverting input terminal.

Also, by configuring the comparator as a hysteresis comparator or by providing a comparator for detecting occurrence of an overshoot and a comparator for detecting settlement of an overshoot separately, it is possible to differentiate the value of the output voltage VOUT at which to detect occurrence of an overshoot and that at which to detect settlement of an overshoot.

The detector DET1 does not necessarily have to detect settlement of an overshoot in the output voltage VOUT. For example, a configuration is also possible where a counter is included in the controller CNT1 and, when the counter counts a given time after detection of occurrence of an overshoot in the output voltage VOUT by the detector DET1, the controller CNT1 judges that the overshoot in the output voltage VOUT has settled down.

In another modified version of the configuration example under discussion, when the detector DET1 detects a sign of occurrence of an overshoot in the output voltage VOUT, the suppressor 3 described above keeps the first and second switches SW1 and SW2 off and keeps the third switch SW3 on so as to suppress the overshoot in the output voltage VOUT.

In yet another modified version of the configuration example under discussion, when the detector DET1 detects a sign of occurrence of an overshoot in the output voltage VOUT, the suppressor 3 described above keeps the first and second switches SW1 and SW2 off and turns the third switch SW3 on and off at a fixed period so as to suppress the overshoot in the output voltage VOUT.

A sign of occurrence of an overshoot in the output voltage VOUT can be detected, for example with a load LD1 that varies regularly and that becomes lighter sharply after a specific variation pattern, by detecting a variation pattern in the load current that corresponds to that specific variation pattern.

First Operation Example of the Switching Power Supply Device on Occurrence of an Overshoot in the Output Voltage FIG. 2 is a time chart showing a first example of operation of the switching power supply device 1 on occurrence of an overshoot in the output voltage VOUT.

When the detector DET1 detects occurrence of an overshoot in the output voltage VOUT, under the control of the controller CNT1, the switching power supply device 1 goes into a second state STATE2. FIG. 2 is a time chart observed when the detector DET1 detects occurrence of an overshoot in the output voltage VOUT in the middle of a first state STATE1 (in the middle of an on-duty period of the switch voltage VSW), leading to the output from the detector DET1 turning from low level to high level and the switching power supply device 1 shifting from the first state STATE to the second state STATE2. In the first state STATE1, under the control of the controller CNT1, the first switch SW1 is kept on, the second switch SW2 is kept off, and the third switch SW3 is kept off.

Figure 3:
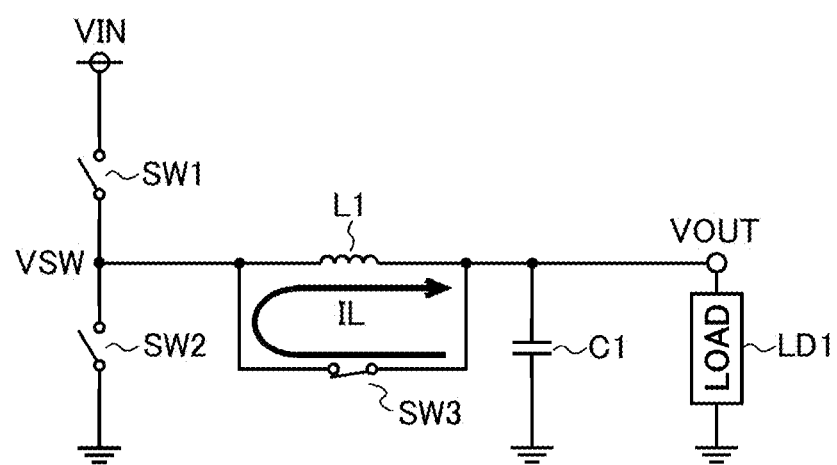
FIG. 3 is a diagram showing how an inductor current is regenerated.

In the second state STATE2, under the control of the controller CNT1, the first and second switches SW1 and SW2 are kept off and the third switch SW3 is kept on. When an overshoot occurs in the output voltage VOUT and the switching power supply device 1 shifts to the second state STATE2, as shown in FIG. 3, the inductor current IL is regenerated in a closed circuit including the inductor L1 and the third switch SW3. This makes it possible to cut off the supply of current toward the load LD1. Since, in the second state STATE2, both the first and second switches SW1 and SW2 are kept off; the output voltage VOUT can be clamped around the level at the occurrence of the overshoot. That is, on occurrence of an overshoot in the output voltage VOUT, by keeping the first and second switches SW1 and SW2 off and the third switch SW3 on, it is possible to prevent the output voltage VOUT from increasing further, and thus to suppress an overshoot in the output voltage VOUT.

Figure 4:
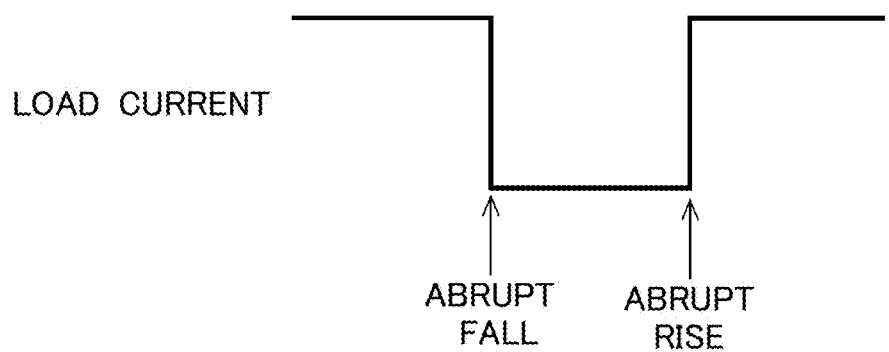
FIG. 4 is a time chart of a load current.

For another example, when the load current (the output current of the switching power supply device 1) falls abruptly and then rises abruptly as shown in FIG. 4, by releasing the regenerated energy stored in the closed circuit including the inductor L1 and the third switch SW3 toward the load LD1, it is possible to suppress also an undershoot in the output voltage VOUT caused by an abrupt rise in the load current.

In this operation example, the switching power supply device 1 is kept in the second state STATE2 until the detector DET1 detects settlement of an overshoot in the output voltage VOUT. While the second state STATE2 is maintained, the inductor current IL decreases gradually due to the on-resistance of the third switch SW3. While, in FIG. 2, when the detector DET1 detects settlement of an overshoot in the output voltage VOUT and the output from the detector DET1 turns from high level to low level, the switching power supply device 1 shifts from the second state STATE2 to the first state STATE1, this should be understood to be only illustrative. That is, the second state STATE2 may be followed by any state other than the first state STATE1.

In this operation example, the second state STATE2 is maintained after occurrence of an overshoot in the output voltage VOUT until its settlement without ever being interrupted. However, so long as an overshoot in the output voltage VOUT can be suppressed, the operation example may be modified such that the second state STATE2 is momentarily interrupted any time after occurrence of an overshoot in the output voltage VOUT before its settlement, or that the second state STATE2 is ended without waiting for settlement of an overshoot in the output voltage VOUT.

Figure 5:
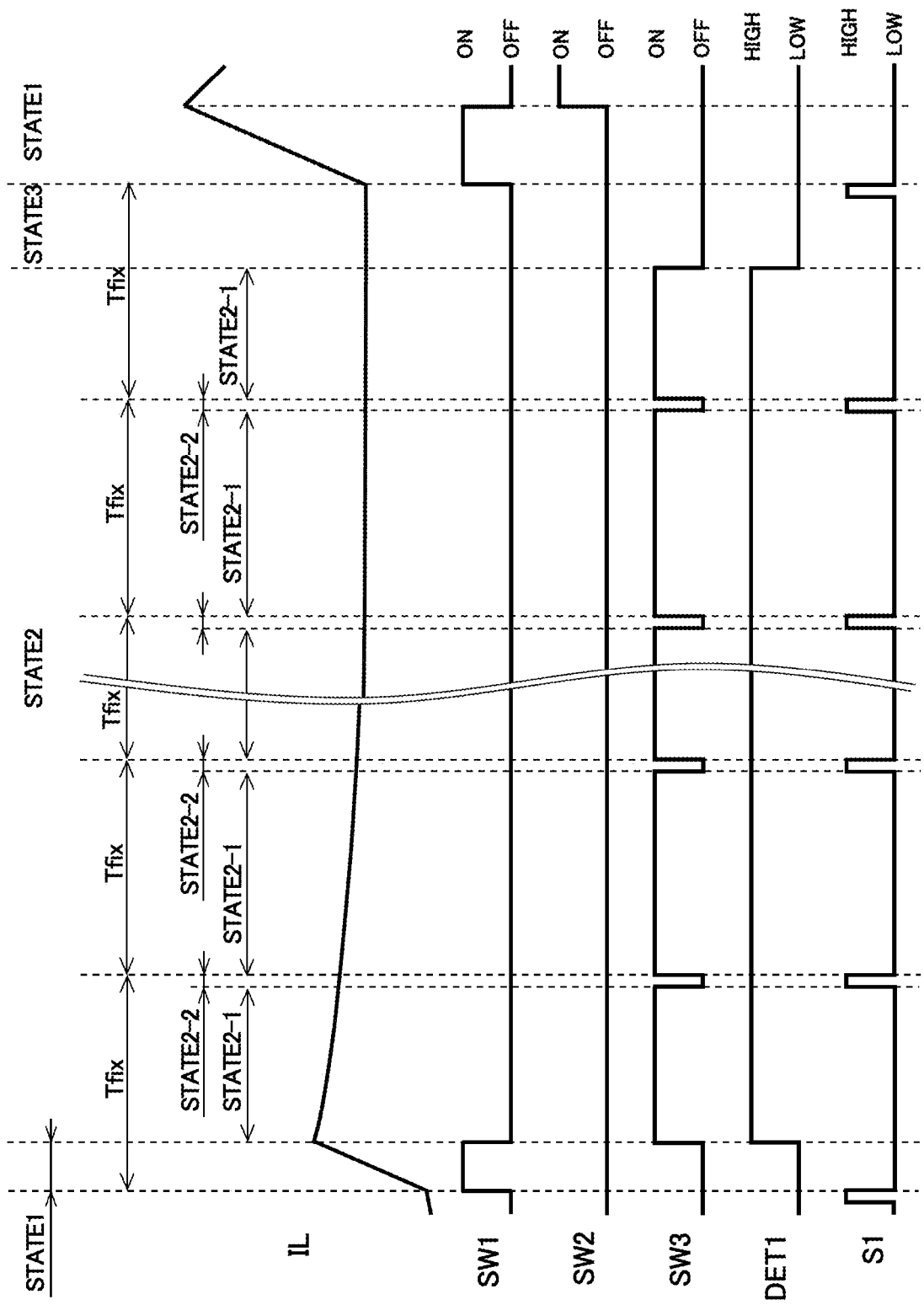
FIG. 5 is a time chart showing a second example of operation of the switching power supply device according to the first configuration example on occurrence of an overshoot in the output voltage.

Second Operation Example of the Switching Power Supply Device on Occurrence of an Overshoot in the Output Voltage FIG. 5 is a time chart showing a second example of operation of the switching power supply device 1 on occurrence of an overshoot in the output voltage VOUT.

When the detector DET1 detects occurrence of an overshoot in the output voltage VOUT, under the control of the controller CNT1, the switching power supply device 1 goes into the second state STATE2. FIG. 5 is a time chart observed when the detector DET1 detects occurrence of an overshoot in the output voltage VOUT in the middle of the first state STATE1 (in the middle of the on-duty period of the switch voltage VSW), the output from the detector DET1 turns from low level to high level, and the switching power supply device 1 shifts from the first state STATE1 to the second state STATE2.

In the first state STATE1, under the control of the controller CNT1, the first and second switches SW1 and SW2 turn on and off complementarily at a fixed period Tfix according to a periodic signal S1, and the third switch SW3 remains off. The periodic signal S1 is a signal in which pulses occur at a fixed period Tfix. The periodic signal S1 may be a signal generated within the controller CNT1 or a signal generated outside the controller CNT1 to be received by the controller CNT1. In the complementary turning on and off of the first and second switches SW1 and SW2, it is preferable to provide a dead time period in which both the first and second switches SW1 and SW2 are off.

In the second state STATE2, under the control of the controller CNT1, the first and second switches SW1 and SW2 remain off and the third switch SW3 turns on and off at a fixed period Tfix. In the second state STATE2, the controller CNT1 turns the third switch SW3 on and off according to the periodic signal S1.

In the second state STATE2, a state STATE2-1 and a state STATE2-2 alternate at a fixed period Tfix. The state STATE2-1 is a period in which the third switch SW3 is on, and the state STATE2-2 is a period in which the third switch SW3 is off.

In this operation example, the switching power supply device 1 is kept in the second state STATE2 until the detector DET1 detects settlement of an overshoot in the output voltage VOUT. While the second state STATE2 is maintained, the inductor current IL falls gradually due to the on-resistance of the third switch SW3. In FIG. 5, when the detector DET1 detects settlement of an overshoot in the output voltage VOUT and the output from the detector DET1 turns from high level to low level, the switching power supply device 1 shifts from the second state STATE2 to a third state STATE3. In the third state STATE3, under the control of the controller CNT1, the first to third switches SW1 to SW3 are kept off.

Then, when, in the third state STATE3, a pulse occurs in the periodic signal S1, a shift from the third state STATE3 to the first state STATE1 takes place.

Now, taking as an example a case where N-channel MOS transistors are used as the first to third switches SW1 to SW3, the state STATE2-1 and the state STATE2-2 will be described in detail. In a modified version of this example, for example, bipolar transistors may be used as the first to third switches SW1 to SW3 with a "reverse-connected diode" connected in parallel with each of the bipolar transistors. The direction in which current passes through the "reverse connection diode" (the direction from the anode to the cathode of the "reverse connection diode") is opposite to the direction in which current passes through the bipolar transistor that is connected in parallel with the "reverse connection diode".

First, a description will be given of a case where the inductor current IL is in the positive direction.

Figure 6:
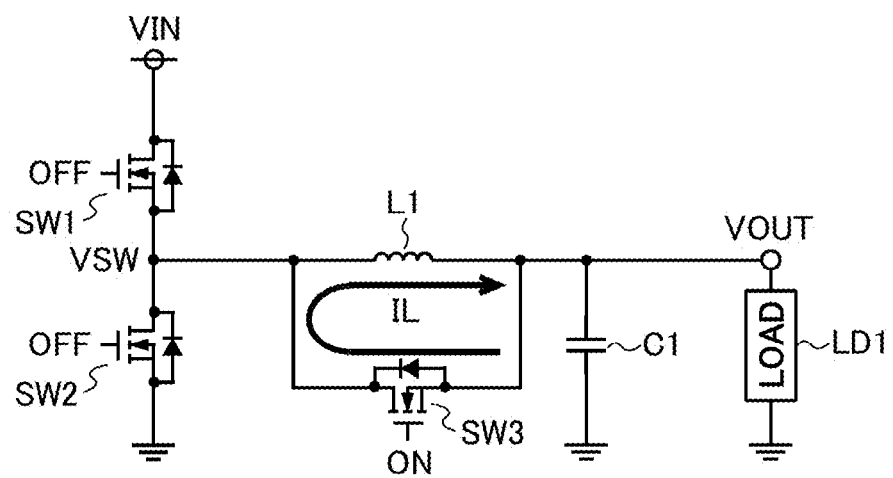
FIG. 6 is a diagram showing how the inductor current is regenerated.

In the state STATE2-1, as shown in FIG. 6, the third switch SW3 is on; thus, the inductor current IL is regenerated in a closed circuit including the inductor L1 and the third switch SW3, and the switching voltage VSW are substantially equal to the output voltage VOUT.

In the state STATE2-1, it is possible to cut off the supply of current toward the load LD1. Moreover, in the state STATE2-1, since the first and second switches SW1 and SW2 are both off, the output voltage VOUT can be clamped around the level at the occurrence of an overshoot. That is, on occurrence of an overshoot in the output voltage VOUT, the first and second switches SW1 and SW2 can be kept off and the third switch SW3 on, and it is thereby possible to prevent the output voltage VOUT from increasing further, and thus to suppress an overshoot in the output voltage VOUT.

Figure 7:
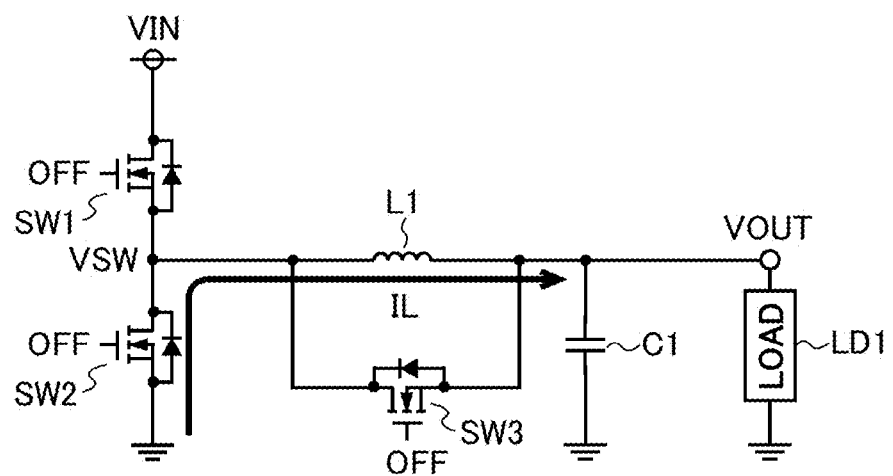
FIG. 7 is a diagram showing how the inductor current passes from the ground via the body diode of a second switch toward an inductor.

In the state STATE2-2, as shown in FIG. 7, the third switch SW3 is off; thus the inductor current IL passes from the ground via the body diode of the second switch SW2 toward the inductor L1. Thus, the switching voltage VSW equals $-Vf_{SW2}$. Here, the $Vf_{SW2}$ is the forward voltage across the body diode of the second switch SW2.

In this operation example, each state STATE2-2 has a fixed duration. More specifically, each state STATE-2-2 has a fixed duration corresponding to the pulse width of the periodic signal S1. It is preferable that the duration of each state STATE2-2 be equal to or shorter than one-tenth of the fixed period Tfix. This is because, if the duration of each state STATE2-2 is longer than one-tenth of the fixed period Tfix, the time required for an overshoot in the output voltage VOUT to settle down exceeds a permissible range.

Figure 8:
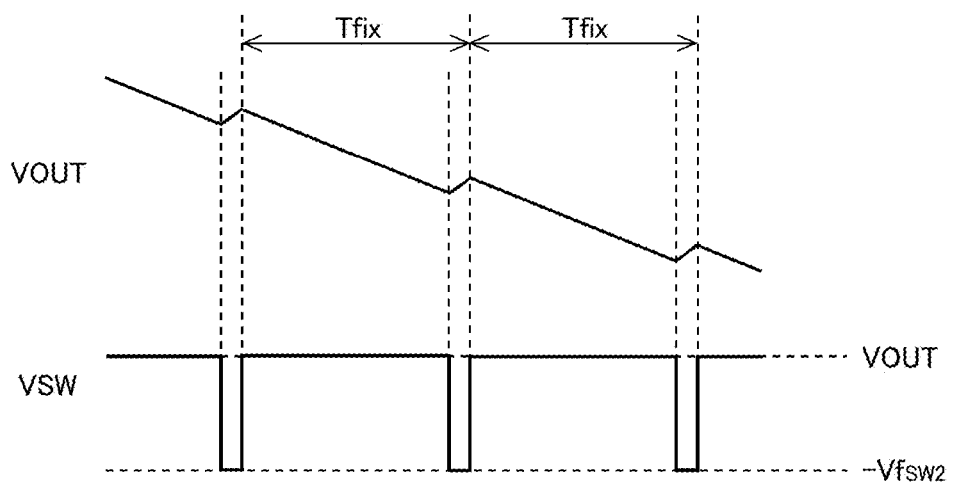
FIG. 8 is waveform diagrams of the output voltage and a switching voltage.

When the inductor current IL is in the positive direction, the output voltage VOUT and the switching voltage VSW in the second state STATE2 are as shown in FIG. 8. Here, the scale of the output voltage VOUT in the vertical direction on the plane of FIG. 8 is enlarged with respect to the switching voltage VSW. As is understood from FIG. 8, the period of the switching voltage VSW is a fixed period Tfix. That is, the frequency (switching frequency) of the switching voltage VSW does not vary; thus the frequency of noise ascribable to the switching frequency does not vary either. Thus, there is no risk of reducing the effect of the noise suppressing means (for example, a filter circuit) for suppressing noise of a fixed frequency.

Next, a description will be given of a case where the inductor current IL is in the negative direction.

Figure 9:
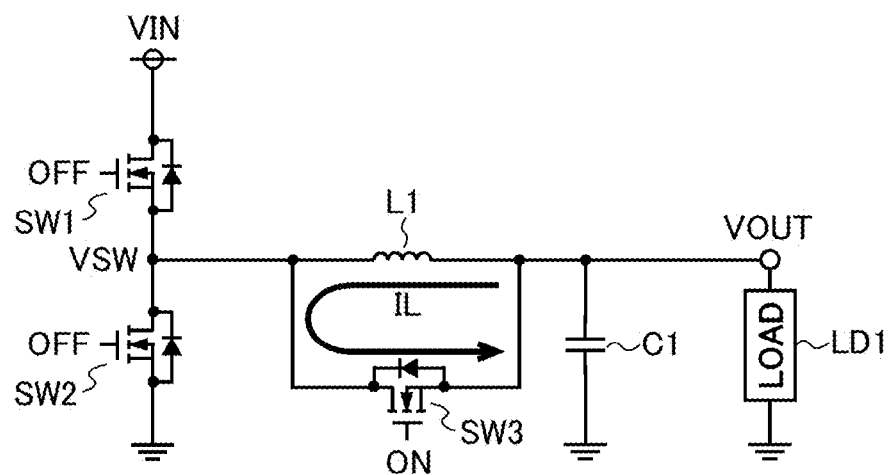
FIG. 9 is a diagram showing how the inductor current is regenerated.

In the state STATE2-1, as shown in FIG. 9, the third switch SW3 is on; thus, the inductor current IL is regenerated in a closed circuit including the inductor L1 and the third switch SW3, and the switching voltage VSW becomes substantially equal to the output voltage VOUT.

In the state STATE2-1, it is possible to cut off the supply of current toward the load LD1. Moreover, in the state STATE2-1, since the first and second switches SW1 and SW2 are both off, the output voltage VOUT can be clamped around the level at the occurrence of an overshoot. That is, on occurrence of an overshoot in the output voltage VOUT, the first and second switches SW1 and SW2 can be kept off and the third switch SW3 on, and it is thereby possible to prevent the output voltage VOUT from increasing further, and thus to suppress an overshoot in the output voltage VOUT.

Figure 10:
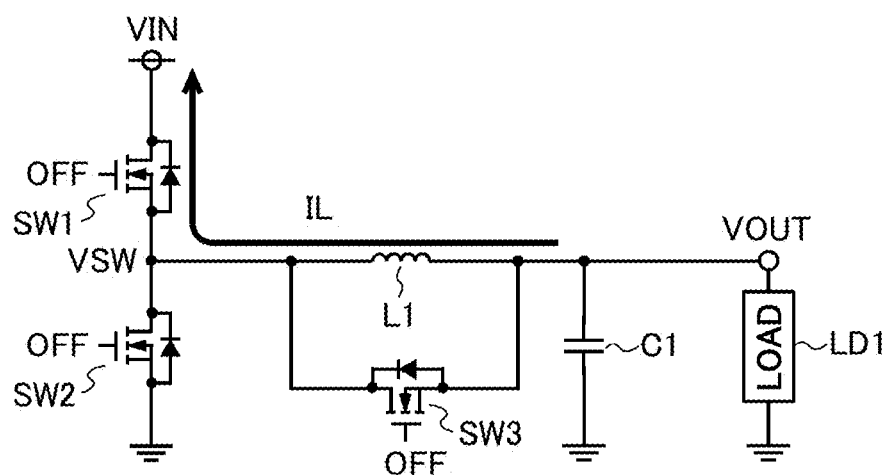
FIG. 10 is a diagram showing how the inductor current passes from the inductor via the body diode of a first switch toward an application terminal for the input voltage.

In the state STATE2-2, as shown in FIG. 10, the third switch SW3 is off; thus the inductor current IL passes from the inductor L1 via the body diode of the first switch SW1 toward the application terminal for the input voltage VIN. Thus, the switching voltage VSW equals VIN+$Vf_{SW1}$. Here, the $Vf_{SW1}$ is the forward voltage across the body diode of the first switch SW1.

Figure 11:
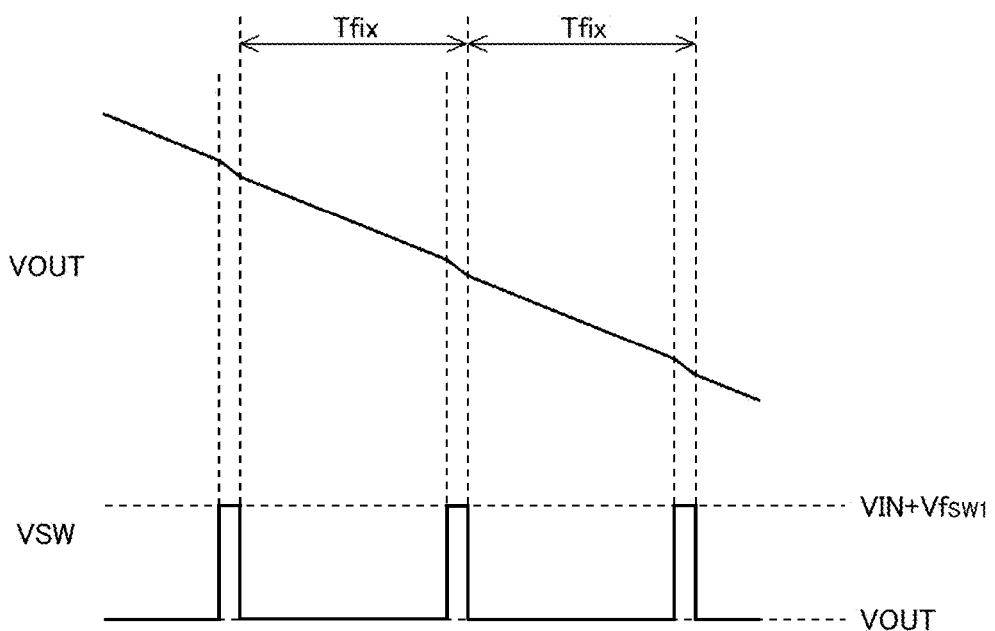
FIG. 11 is waveform diagrams of the output voltage and the switching voltage.

When the inductor current IL is in the negative direction, the output voltage VOUT and the switching voltage VSW in the second state STATE2 are as shown in FIG. 11. Here, the scale of the output voltage VOUT in the vertical direction on the plane of FIG. 11 is enlarged with respect to the switching voltage VSW. As is understood from FIG. 11, the period of the switching voltage VSW is a fixed period Tfix. That is, the frequency (switching frequency) of the switching voltage VSW does not vary; thus the frequency of noise ascribable to the switching frequency does not vary either. Thus, there is no risk of reducing the effect of the noise suppressing means (for example, a filter circuit) for suppressing noise of a fixed frequency.

<Second Configuration Example of the Switching Power Supply Device>

Figure 12A:
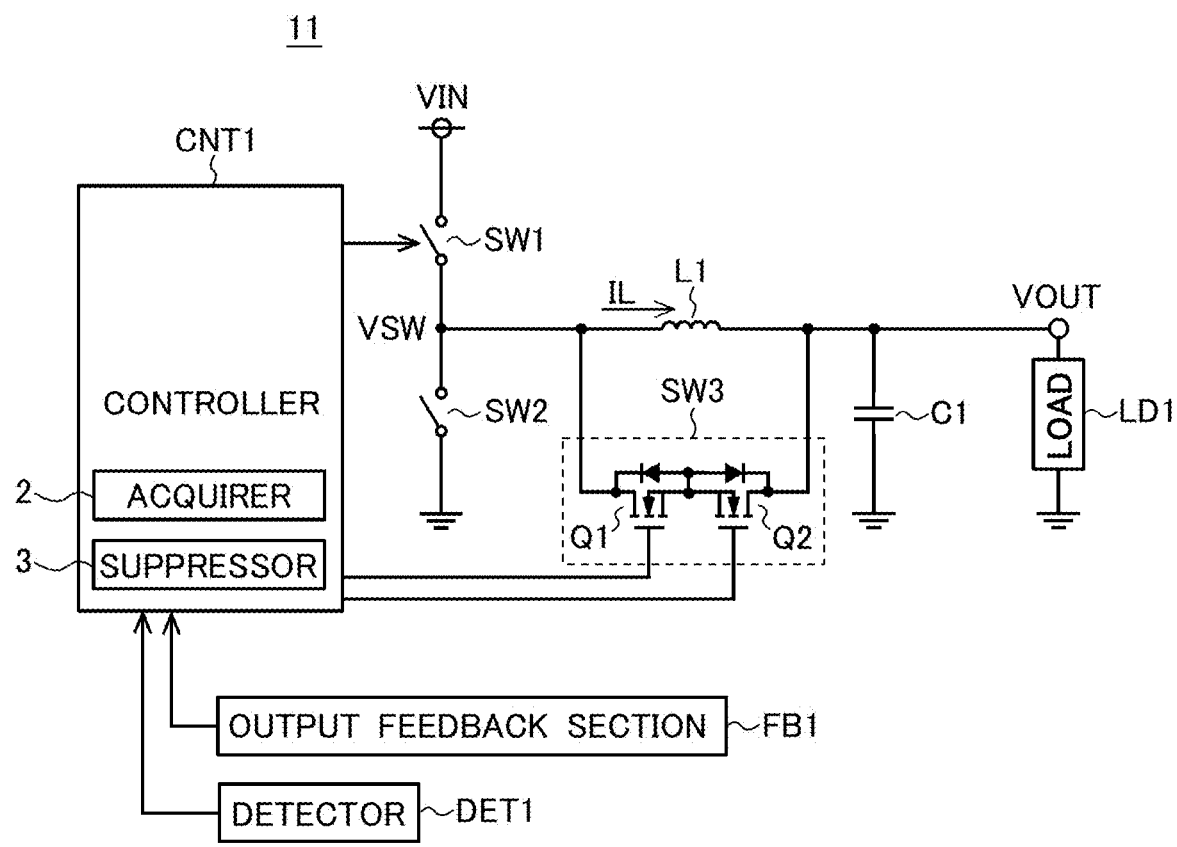
FIG. 12A is a diagram showing a second configuration example of an asynchronous rectification switching power supply device.
Figure 12B:
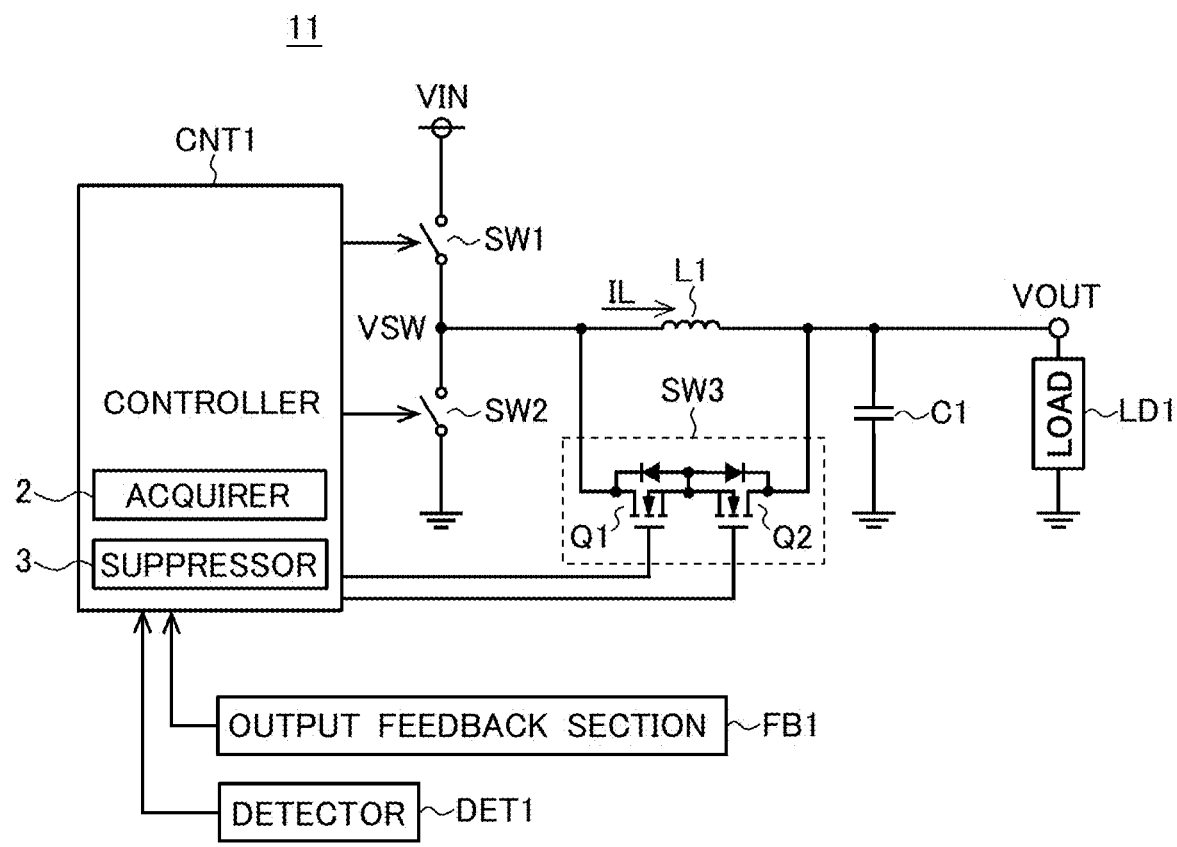
FIG. 12B is a diagram showing a second configuration example of a synchronous rectification switching power supply device.

FIGS. 12A and 12B are diagrams showing a second configuration example of the switching power supply device. In FIGS. 12A and 12B, for features similar to those in FIGS. 1A and 1B, no overlapping description will be repeated. The switching power supply device 1' shown in FIGS. 12A and 12B is a switching power supply device that bucks (steps down) an input voltage VIN to an output voltage VOUT and includes a controller CNT1, a first to a third switch SW1 to SW3, an inductor L1, an output capacitor C1, an output feedback section FB1, and a detector DET1. The diodes shown in FIGS. 12A and 12B are the body diodes of MOS transistors. Likewise, also the diodes shown in FIGS. 14, 15, 17, 18, 20, 21, 23, 24, 26, 27, 29, 30, and 33 referred to later are the body diodes of MOS transistors.

In this configuration example, a suppressor 3 turns on and off the first, second, and third switches SW1, SW2, and SW in accordance with the detection result from the detector DET1 that is acquired by the acquirer 2, and, after the detector DET1 detects occurrence of an overshoot in the output voltage VOUT until the detector DET1 detects settlement of the overshoot in the output voltage VOUT, the suppressor 3 keeps the first and second switches SW1 and SW2 off and turns the third switch SW3 on and off at a fixed period to suppress the overshoot in the output voltage VOUT.

For example, with a diode used as the second switch SW2, the switching power supply device 1' acts as an asynchronous rectification switching power supply device as shown in FIG. 12A.

When the switching power supply device 1' acts as an asynchronous rectification switching power supply device, the controller CNT1 controls the bias voltage applied to the switch SW2 (diode) by turning the switch SW1 on and off. Whether the switch SW2 (diode) is on or off is determined by the bias voltage applied to the switch SW2 (diode); thus, the controller CNT1 turns the switch SW2 (diode) on and off indirectly.

For example, with an N-channel MOS transistor used as the second switch SW2, the switching power supply device 1' acts as a synchronous rectification switching power supply device as shown in FIG. 12B. When the switching power supply device 1' acts as a synchronous rectification switching power supply device, the switching power supply device 1' may be configured to operate in a current continuous mode under a light load or may be configured to have a reverse current prevention function and operate in a current discontinuous mode under a light load.

As the third switch SW3, for example, an N-channel MOS transistor can be used. The third switch SW3 includes a first switching element and a second switching element that are connected in series with each other. In the configuration example shown in FIGS. 12A and 12B, as the first and second switching elements, two N-channel MOS transistors Q1 and Q2 are used. The drain of the N-channel MOS transistor Q1 is connected to the connection node between the first and second switches SW1 and SW2. The source and the back gate of the N-channel MOS transistor Q1 is connected to the source and the back gate of the N-channel MOS transistor Q2. The drain of the N-channel MOS transistor Q2 is connected to the connection node between the inductor L1 and the output capacitor C1. The N-channel MOS transistor Q1 is provided in the input side and the N-channel MOS transistor Q2 is provided in the output side; thus, preferably, the N-channel MOS transistor Q1 is given a higher withstand voltage than the N-channel MOS transistor Q2.

Figure 13:
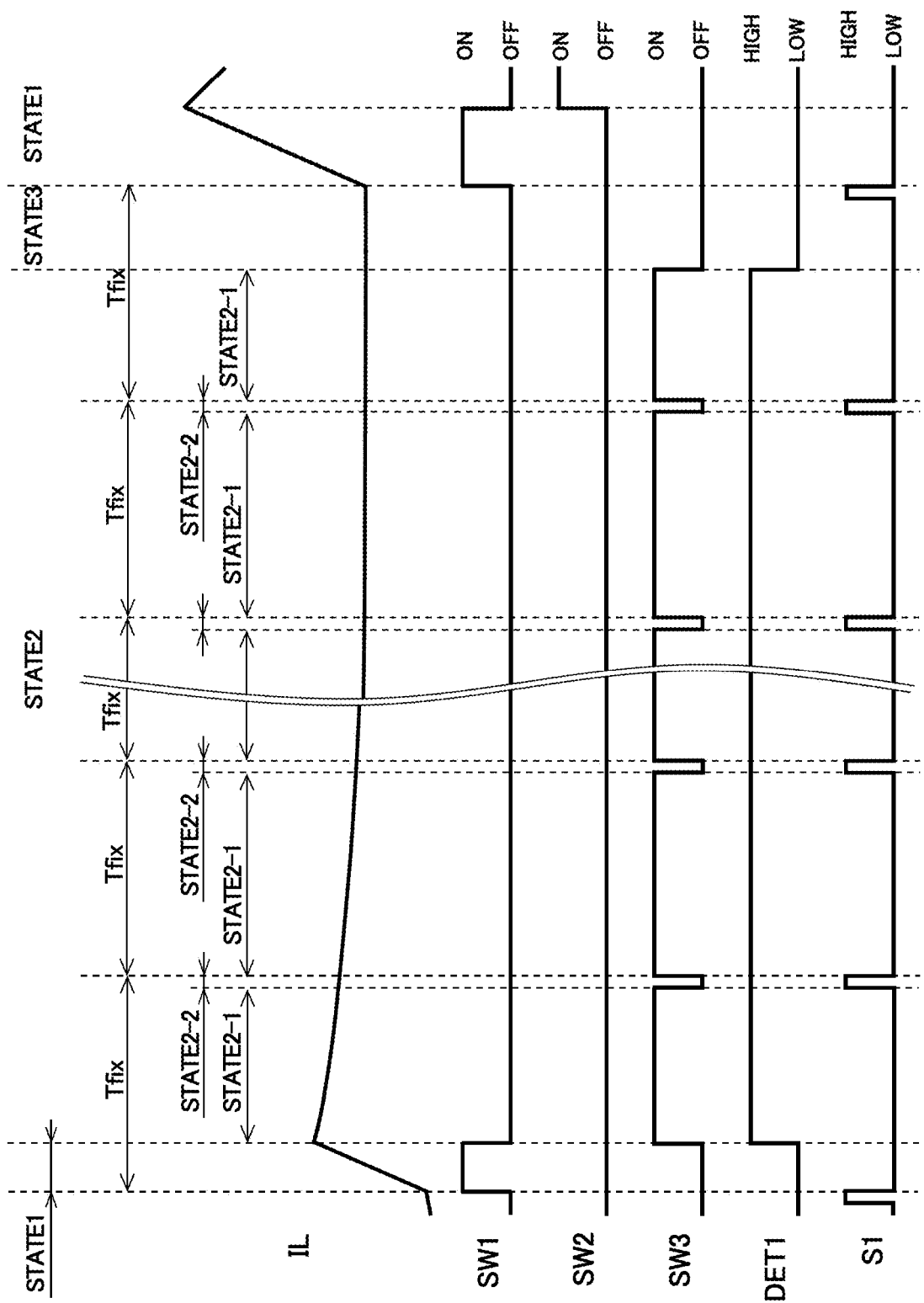
FIG. 13 is a time chart showing an example of operation of the switching power supply device according to the second configuration example on occurrence of an overshoot in an output voltage.

The detector DET1 detects occurrence and settlement of an overshoot in the output voltage VOUT. As the detector DET1, for example, a comparator can be used that receives the output voltage VOUT at its non-inverting input terminal and receives a constant voltage (a voltage higher than the target value of the output voltage VOUT) at its inverting input terminal. When an overshoot occurs in the output voltage VOUT, the comparator switches its output signal from low level to high level. When the overshoot in the output voltage VOUT settles down, the comparator switches its output signal from high level to low level. FIG. 13 referred to later shows the output signal in this example.

A configuration is also possible where the comparator receives, instead of the output voltage VOUT, a division voltage of the output voltage VOUT at its non-inverting input terminal and receives, instead of the constant voltage, a division voltage of the constant voltage at its inverting input terminal.

Also, by configuring the comparator as a hysteresis comparator or by providing a comparator for detecting occurrence of an overshoot and a comparator for detecting settlement of an overshoot separately, it is possible to differentiate the value of the output voltage VOUT at which to detect occurrence of an overshoot and that at which to detect settlement of an overshoot.

In a modified version of the configuration example under discussion, when the detector DET1 detects a sign of occurrence of an overshoot in the output voltage VOUT, the suppressor 3 described above keeps the first and second switches SW1 and SW2 off and turns the third switch SW3 on and off at a fixed period so as to suppress the overshoot in the output voltage VOUT.

A sign of occurrence of an overshoot in the output voltage VOUT can be detected, for example with a load LD1 that varies regularly and that becomes lighter sharply after a specific variation pattern, by detecting a variation pattern in the load current that corresponds to that specific variation pattern.

<Operation Example of the Switching Power Supply Device on Occurrence of an Overshoot in the Output Voltage>

FIG. 13 is a time chart showing the operation of the switching power supply device 1' on occurrence of an overshoot in the output voltage VOUT.

When the detector DET1 detects occurrence of an overshoot in the output voltage VOUT, under the control of the controller CNT1, the switching power supply device 1' goes into a second state STATE2. FIG. 13 is a time chart observed when the detector DET1 detects occurrence of an overshoot in the output voltage VOUT in the middle of a first state STATE1 (in the middle of the on-duty period of the switching voltage VSW), the output from the detector DET1 turns from low level to high level, and the switching power supply device 1' shifts from the first state STATE1 to the second state STATE2.

In the first state STATE1, under the control of the controller CNT1, the first and second switches SW1 and SW2 turn on and off complementarily at a fixed period Tfix according to a periodic signal S1, and the third switch SW3 remains off. The periodic signal S1 is a signal in which pulses occur at a fixed period Tfix. The periodic signal S1 may be a signal generated within the controller CNT1 or a signal generated outside the controller CNT1 to be received by the controller CNT1. In the complementary turning on and off of the first and second switches SW1 and SW2, it is preferable to provide a dead time period in which both the first and second switches SW1 and SW2 are off.

In the second state STATE2, under the control of the controller CNT1, the first and second switches SW1 and SW2 remain off and the third switch SW3 turns on and off at a fixed period. In the second state STATE2, the controller CNT1 turns the third switch SW3 on and off according to the periodic signal S1.

In the second state STATE2, a state STATE2-1 and a state STATE2-2 alternate at the fixed period Tfix. The state STATE2-1 is a period in which the third switch SW3 is on, and the state STATE2-2 is a period in which the third switch SW3 is off.

In this operation example, the switching power supply device 1' is kept in the second state STATE2 until the detector DET1 detects settlement of an overshoot in the output voltage VOUT. While the second state STATE2 is maintained, the inductor current IL falls gradually due to the on-resistance of the third switch SW3. In FIG. 13, when the detector DET1 detects settlement of an overshoot in the output voltage VOUT and the output from the detector DET1 turns from high level to low level, the switching power supply device 1' shifts from the second state STATE2 to the third state STATE3. In the third state STATE3, under the control of the controller CNT1, the first to third switches SW1 to SW3 are kept off.

Then, when, in the third state STATE3, a pulse occurs in the periodic signal S1, a shift from the third state STATE3 to the first state STATE1 takes place.

Now, taking as an example a case where N-channel MOS transistors are used as the first and second switches SW1 and SW2, the state STATE2-1 and the state STATE2-2 will be described in detail, in each of three control patterns. In a modified version of this example, for example, bipolar transistors may be used as the first and second switches SW1 and SW2 with a "reverse connection diode" connected in parallel with each of the bipolar transistors. The direction in which current passes through the "reverse connection diode" (the direction from the anode to the cathode of the "reverse connection diode") is opposite to the direction in which current passes through the bipolar transistor that is connected in parallel with the "reverse connection diode". Likewise, bipolar transistors may be used instead of the N-channel MOS transistors Q1 and Q2 with a "reverse connection diode" connected in parallel with each of the bipolar transistors.

<First Control Pattern>

First, a description will be given of a case where the inductor current IL is in the positive direction.

Figure 14:
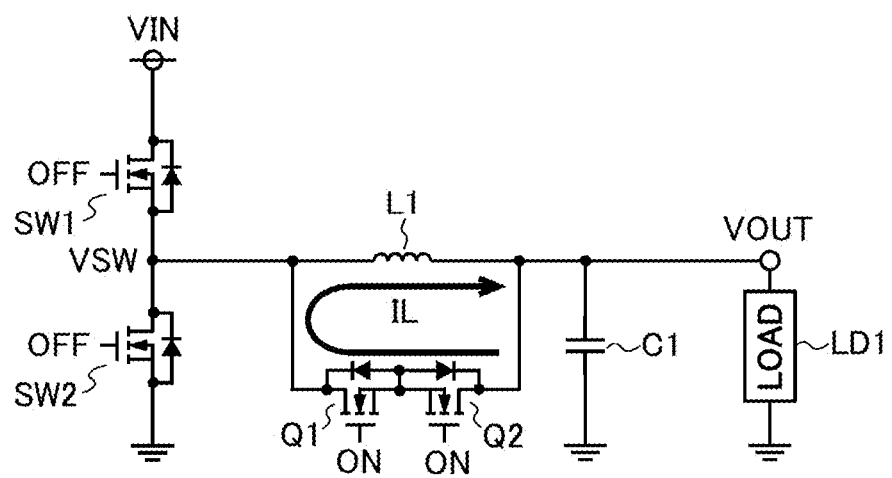
FIG. 14 is a diagram showing how the inductor current is regenerated (a first control pattern)

In the state STATE2-1, as shown in FIG. 14, the N-channel MOS transistors Q1 and Q2 are kept on; thus, the inductor current IL is regenerated in a closed circuit including the inductor L1 and the N-channel MOS transistors Q1 and Q2, and the switching voltage VSW is substantially equal to the output voltage VOUT.

In the state STATE2-1, it is possible to cut off the supply of current toward the load LD1. Moreover, in the state STATE2-1, since the first and second switches SW1 and SW2 are both off, the output voltage VOUT can be clamped around the level at the occurrence of an overshoot. That is, by keeping the first and second switches SW1 and SW2 off and the N-channel MOS transistors Q1 and Q2 on when an overshoot occurs in the output voltage VOUT, it is possible to prevent the output voltage VOUT from increasing further, and thus to suppress an overshoot in the output voltage VOUT.

Figure 15:
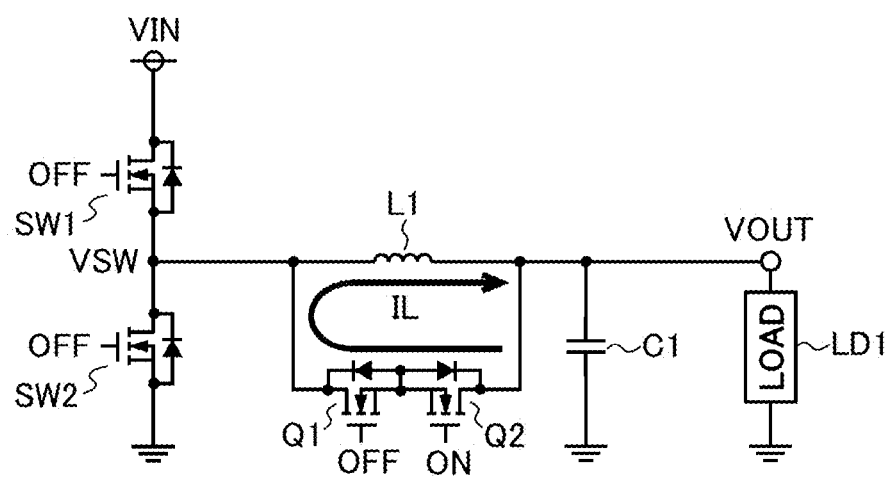
FIG. 15 is a diagram showing how the inductor current passes from the ground via the body diode of the second switch toward the inductor (the first control pattern)

In the state STATE2-2, as shown in FIG. 15, the N-channel MOS transistor Q1 is kept off; thus, the inductor current IL is regenerated in a closed circuit including the inductor L1, the body diode of the N-channel MOS transistor Q1, and the N-channel MOS transistor Q2. Thus, the switching voltage VSW equals $VOUT-Vf_{Q1}$. Here, the $Vf_{Q1}$ is the forward voltage across the body diode of the N-channel MOS transistor Q1.

In this operation example, each state STATE2-2 has a fixed duration. More specifically, each state STATE-2-2 has a fixed duration corresponding to the pulse width of the periodic signal S1. It is preferable that the duration of each state STATE2-2 be equal to or shorter than one-tenths of the fixed period Tfix. This is because, if the duration of each state STATE2-2 is longer than one-tenths of the fixed period Tfix, the time required for an overshoot in the output voltage VOUT to settle down exceeds a permissible range.

Figure 16:
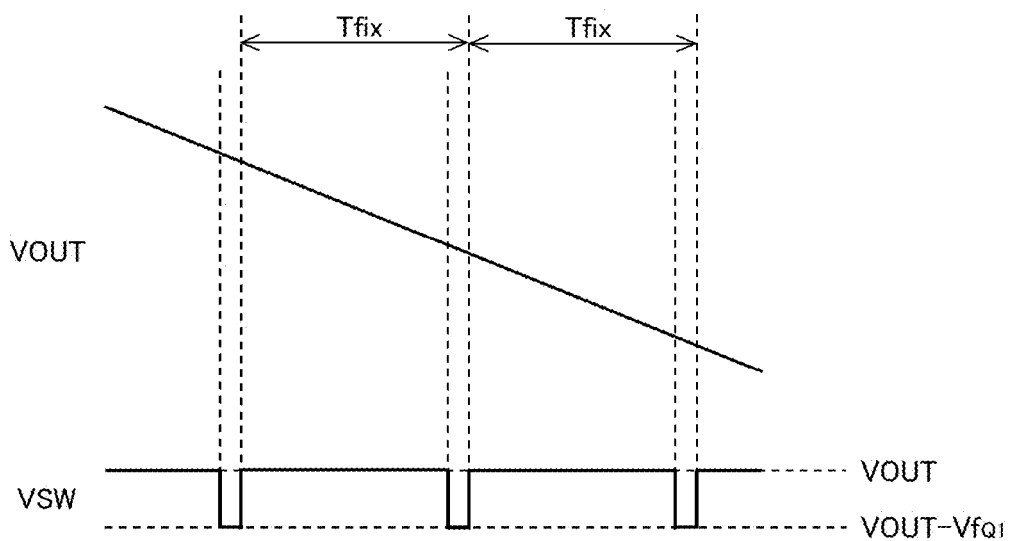
FIG. 16 is waveform diagrams of the output voltage and the switching voltage (the first control pattern)

When the inductor current IL is in the positive direction, the output voltage VOUT and the switching voltage VSW in the second state STATE2 are as shown in FIG. 16. Here, the scale of the output voltage VOUT in the vertical direction on the plane of FIG. 16 is enlarged with respect to the switching voltage VSW. As is understood from FIG. 16, the period of the switching voltage VSW is a fixed period Tfix. That is, the frequency (switching frequency) of the switching voltage VSW does not vary; thus the frequency of noise ascribable to the switching frequency does not vary either. Thus, there is no risk of reducing the effect of the noise suppressing means (for example, a filter circuit) for suppressing noise of a fixed frequency.

Next, a description will be given of a case where the inductor current IL is in the negative direction.

Figure 17:
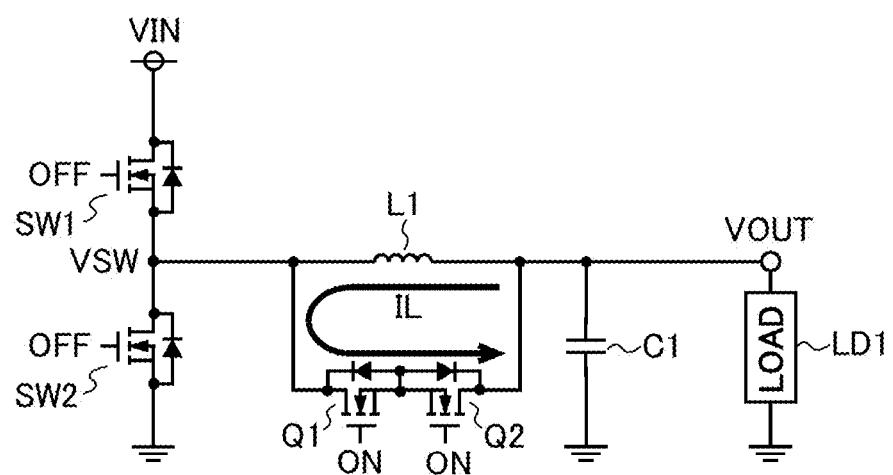
FIG. 17 is a diagram showing how the inductor current is regenerated (the first control pattern)

In the state STATE2-1, as shown in FIG. 17, the N-channel MOS transistors Q1 and Q2 are kept on; thus, the inductor current IL is regenerated in a closed circuit including the inductor L1 and the N-channel MOS transistors Q1 and Q2, and the switching voltage VSW is substantially equal to the output voltage VOUT.

In the state STATE2-1, it is possible to cut off the supply of current toward the load LD1. Moreover, in the state STATE2-1, since the first and second switches SW1 and SW2 are both off, the output voltage VOUT can be clamped around the level at the occurrence of an overshoot. That is, by keeping the first and second switches SW1 and SW2 off and the N-channel MOS transistors Q1 and Q2 on when an overshoot occurs in the output voltage VOUT, it is possible to prevent the output voltage VOUT from increasing further, and thus to suppress an overshoot in the output voltage VOUT.

Figure 18:
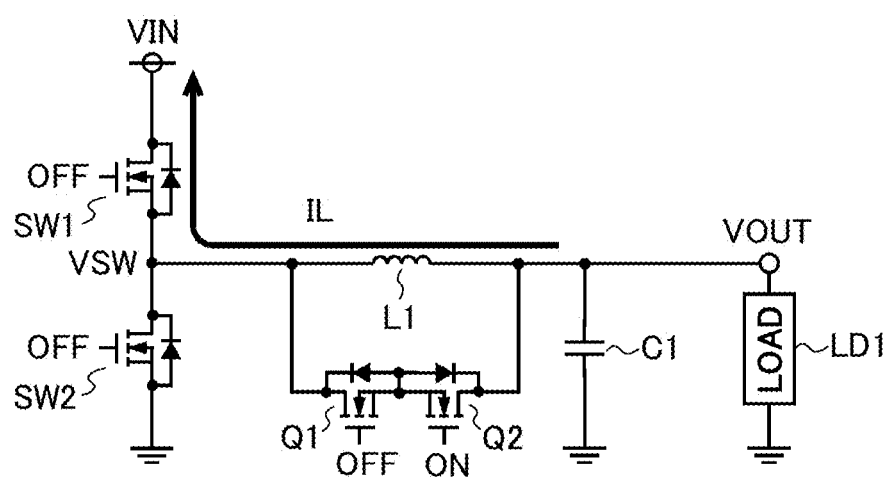
FIG. 18 is a diagram showing how the inductor current passes from the inductor via the body diode of the first switch toward the application terminal for the input voltage (the first control pattern)

In the state STATE2-2, as shown in FIG. 18, the N-channel MOS transistor Q1 is off; thus the inductor current IL passes from the inductor L1 via the body diode of the first switch SW1 toward the application terminal for the input voltage VIN. Thus, the switching voltage VSW equals VIN+$VF_{SW1}$. Here, the $Vf_{SW1}$ is the forward voltage across the body diode of the first switch SW1.

Figure 19:
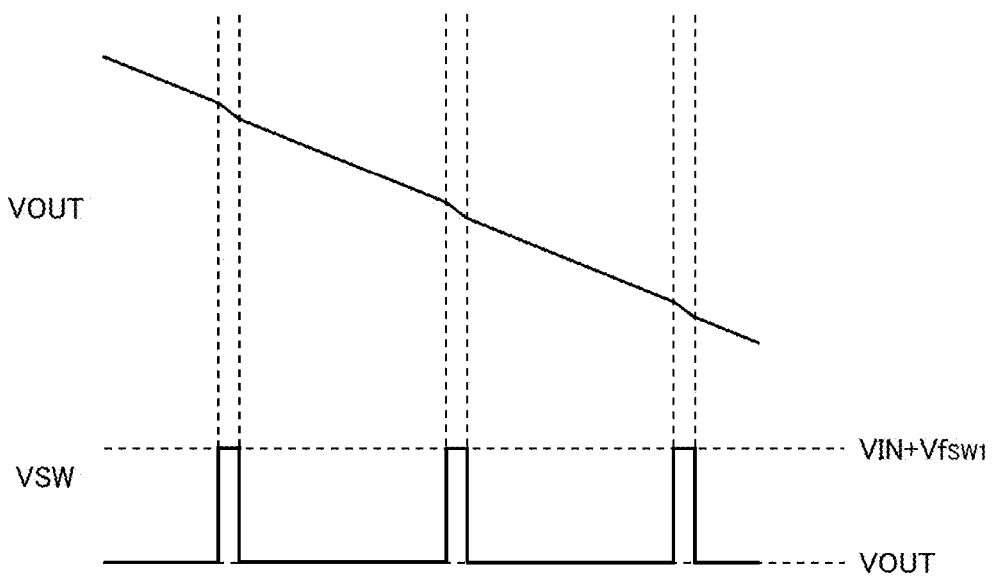
FIG. 19 is waveform diagrams of the output voltage and the switching voltage (the first control pattern)

When the inductor current IL is in the negative direction, the output voltage VOUT and the switching voltage VSW in the second state STATE2 is as shown in FIG. 19. Here, the scale of the output voltage VOUT in the vertical direction on the plane of FIG. 19 is enlarged with respect to the switching voltage VSW. As is understood from FIG. 19, the period of the switching voltage VSW is a fixed period Tfix. That is, the frequency (switching frequency) of the switching voltage VSW does not vary; thus the frequency of noise ascribable to the switching frequency does not vary either. Thus, there is no risk of reducing the effect of the noise suppressing means (for example, a filter circuit) for suppressing noise of a fixed frequency.

<Second Control Pattern>

First, a description will be given of a case where the inductor current IL is in the positive direction.

Figure 20:
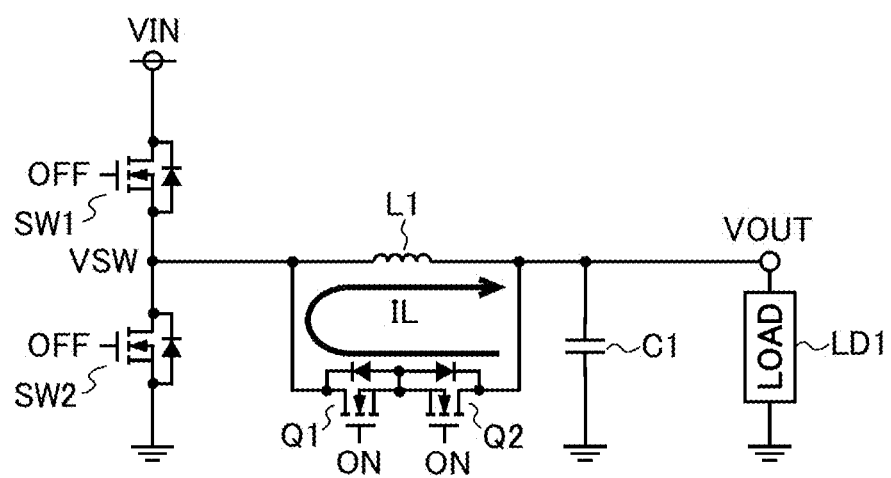
FIG. 20 is a diagram showing how the inductor current is regenerated (a second control pattern)

In the state STATE2-1, as shown in FIG. 20, the N-channel MOS transistors Q1 and Q2 are kept on; thus, the inductor current IL is regenerated in a closed circuit including the inductor L1 and the N-channel MOS transistors Q1 and Q2, and the switching voltage VSW is substantially equal to the output voltage VOUT.

In the state STATE2-1, it is possible to cut off the supply of current toward the load LD1. Moreover, in the state STATE2-1, since the first and second switches SW1 and SW2 are both off, the output voltage VOUT can be clamped around the level at the occurrence of an overshoot. That is, by keeping the first and second switches SW1 and SW2 off and the N-channel MOS transistors Q1 and Q2 on when an overshoot occurs in the output voltage VOUT, it is possible to prevent the output voltage VOUT from increasing further, and thus to suppress an overshoot in the output voltage VOUT.

Figure 21:
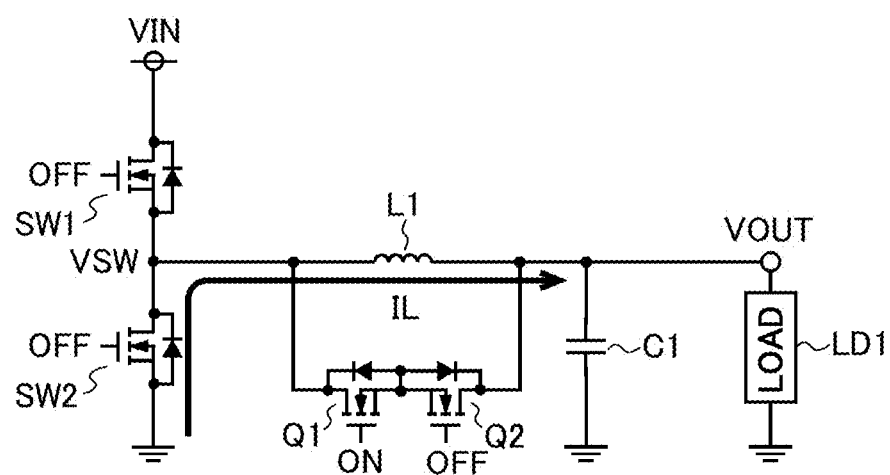
FIG. 21 is a diagram showing how the inductor current passes from the ground via the body diode of the second switch toward the inductor (the second control pattern)

In the state STATE2-2, as shown in FIG. 21, the N-channel MOS transistor Q2 is off; thus the inductor current IL passes from the ground via the body diode of the second switch SW2 toward the inductor L1. Thus, the switching voltage VSW equals $-Vf_{SW2}$. Here, the $Vf_{SW2}$ is the forward voltage across the body diode of the second switch SW2.

Figure 22:
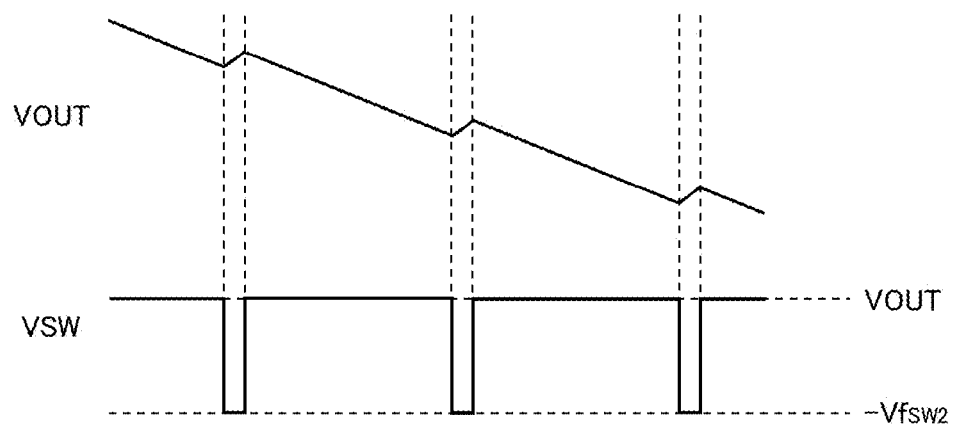
FIG. 22 is waveform diagrams of the output voltage and the switching voltage (the second control pattern)

When the inductor current IL is in the positive direction, the output voltage VOUT and the switching voltage VSW in the second state STATE2 are as shown in FIG. 22. Here, the scale of the output voltage VOUT in the vertical direction on the plane of FIG. 22 is enlarged with respect to the switching voltage VSW. As is understood from FIG. 22, the period of the switching voltage VSW is a fixed period Tfix. That is, the frequency (switching frequency) of the switching voltage VSW does not vary; thus the frequency of noise ascribable to the switching frequency does not vary either. Thus, there is no risk of reducing the effect of the noise suppressing means (for example, a filter circuit) for suppressing noise of a fixed frequency.

Next, a description will be given of a case where the inductor current IL is in the negative direction.

Figure 23:
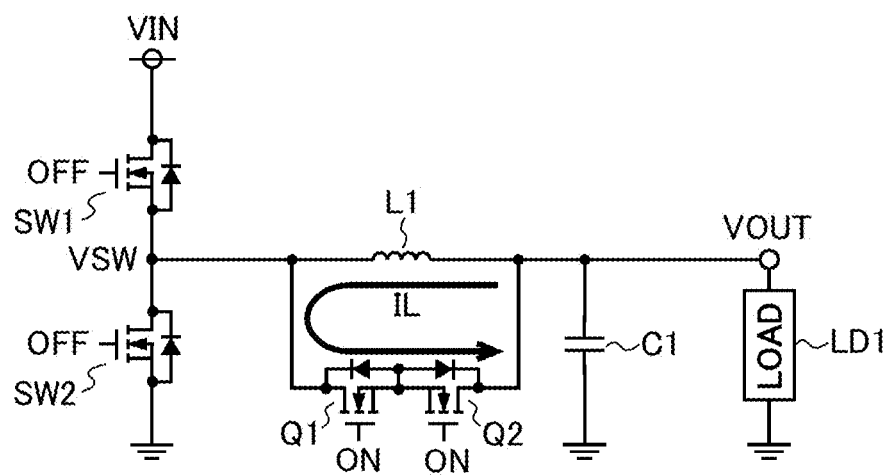
FIG. 23 is a diagram showing how the inductor current is regenerated (the second control pattern)

In the state STATE2-1, as shown in FIG. 23, the N-channel MOS transistors Q1 and Q2 are kept on; thus, the inductor current IL is regenerated in a closed circuit including the inductor L1 and the N-channel MOS transistors Q1 and Q2, and the switching voltage VSW is substantially equal to the output voltage VOUT.

In the state STATE2-1, it is possible to cut off the supply of current toward the load LD1. Moreover, in the state STATE2-1, since the first and second switches SW1 and SW2 are both off, the output voltage VOUT can be clamped around the level at the occurrence of an overshoot. That is, by keeping the first and second switches SW1 and SW2 off and the N-channel MOS transistors Q1 and Q2 on when an overshoot occurs in the output voltage VOUT, it is possible to prevent the output voltage VOUT from increasing further, and thus to suppress an overshoot in the output voltage VOUT.

Figure 24:
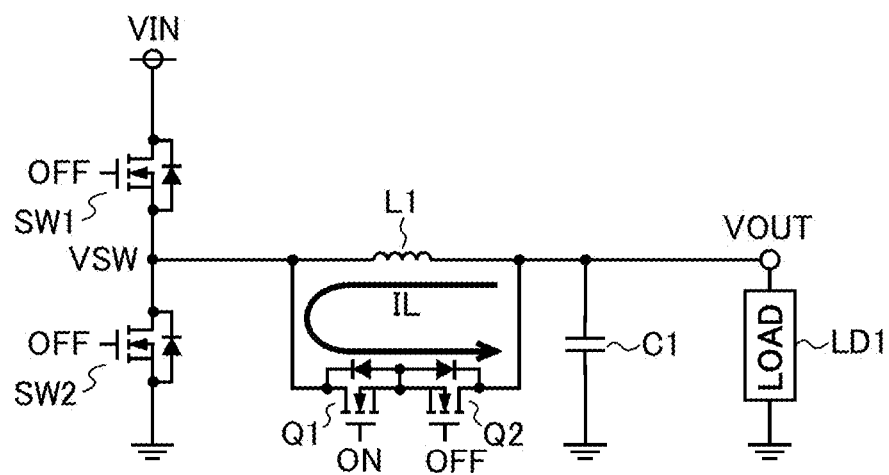
FIG. 24 is a diagram showing how the inductor current passes from the inductor via the body diode of the first switch toward the application terminal for the input voltage (the second control pattern)

In the state STATE2-2, as shown in FIG. 24, the N-channel MOS transistor Q2 is kept off; thus, the inductor current IL is regenerated in a closed circuit including the inductor L1, the N-channel MOS transistor Q1, and the body diode of the N-channel MOS transistor Q2. Thus, the switching voltage VSW equals VOUT+$Vf_{Q2}$. Here, the $Vf_{Q2}$ is the forward voltage across the body diode of the N-channel MOS transistor Q2.

Figure 25:
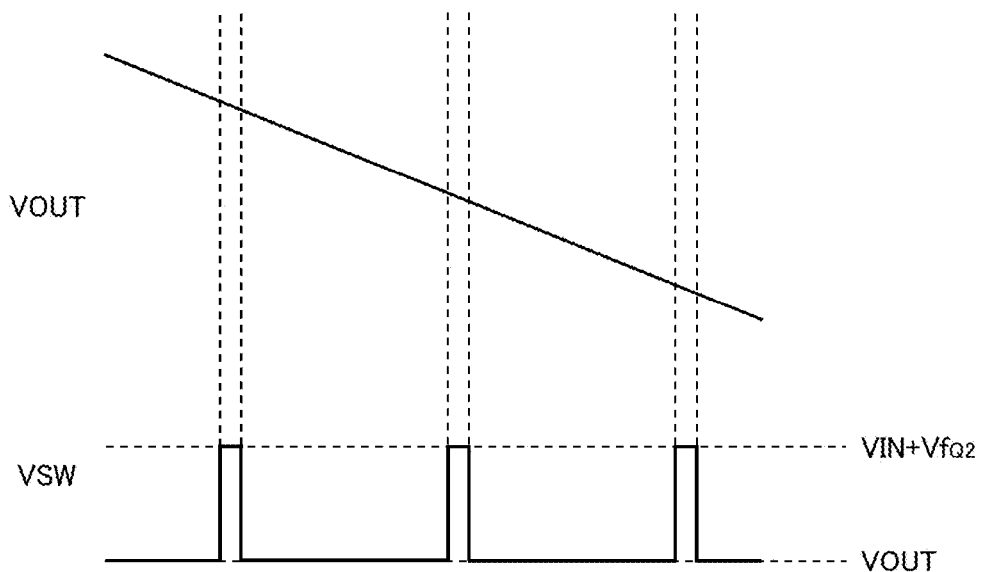
FIG. 25 is waveform diagrams of the output voltage and the switching voltage (the second control pattern)

When the inductor current IL is in the negative direction, the output voltage VOUT and the switching voltage VSW in the second state STATE2 are as shown in FIG. 25. Here, the scale of the output voltage VOUT in the vertical direction on the plane of FIG. 25 is enlarged with respect to the switching voltage VSW. As is understood from FIG. 25, the period of the switching voltage VSW is a fixed period Tfix. That is, the frequency (switching frequency) of the switching voltage VSW does not vary; thus the frequency of noise ascribable to the switching frequency does not vary either. Thus, there is no risk of reducing the effect of the noise suppressing means (for example, a filter circuit) for suppressing noise of a fixed frequency.

<Third Control Pattern>

First, a description will be given of a case where the inductor current IL is in the positive direction.

Figure 26:
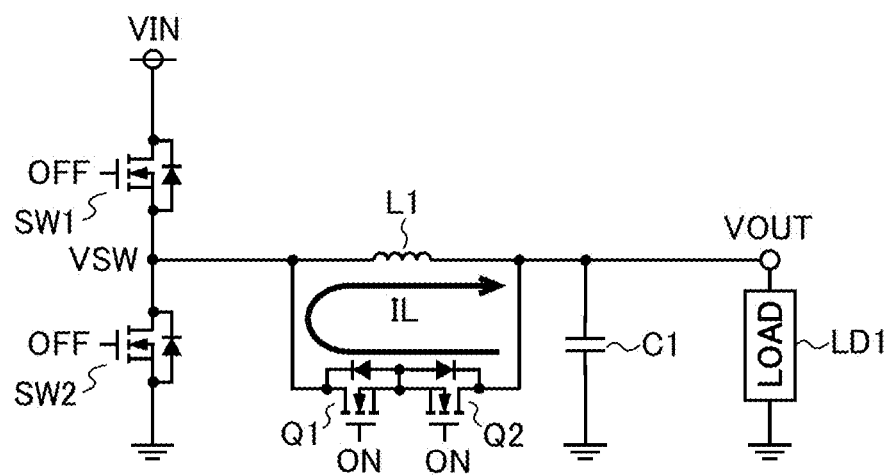
FIG. 26 is a diagram showing how the inductor current is regenerated (a third control pattern)

In the state STATE2-1, as shown in FIG. 26, the N-channel MOS transistors Q1 and Q2 are kept on; thus, the inductor current IL is regenerated in a closed circuit including the inductor L1 and the N-channel MOS transistors Q1 and Q2, and the switching voltage VSW is substantially equal to the output voltage VOUT.

In the state STATE2-1, it is possible to cut off the supply of current toward the load LD1. Moreover, in the state STATE2-1, since the first and second switches SW1 and SW2 are both off, the output voltage VOUT can be clamped around the level at the occurrence of an overshoot. That is, by keeping the first and second switches SW1 and SW2 off and the N-channel MOS transistors Q1 and Q2 on when an overshoot occurs in the output voltage VOUT, it is possible to prevent the output voltage VOUT from increasing further, and thus to suppress an overshoot in the output voltage VOUT.

Figure 27:
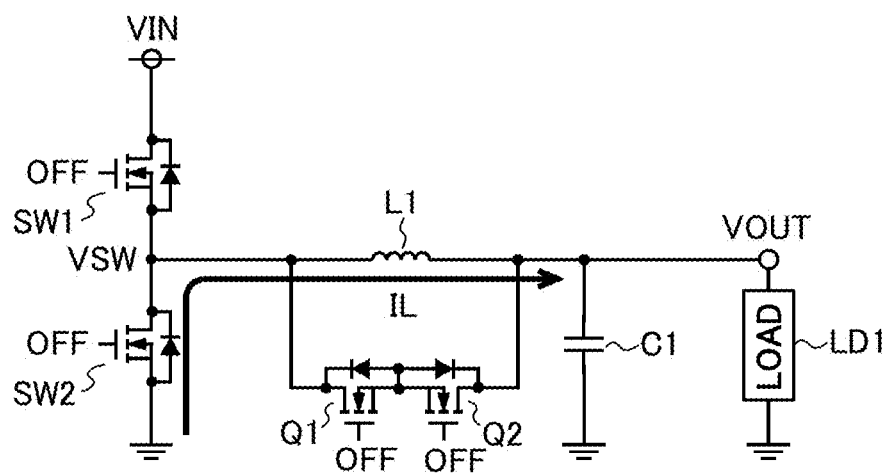
FIG. 27 is a diagram showing how the inductor current passes from the ground via the body diode of a second switch toward the inductor (the third control pattern)

In the state STATE2-2, as shown in FIG. 27, the N-channel MOS transistors Q1 and Q2 are off; thus the inductor current IL passes from the ground via the body diode of the second switch SW2 toward the inductor L1. Thus, the switching voltage VSW equals $-Vf_{SW2}$.

Figure 28:
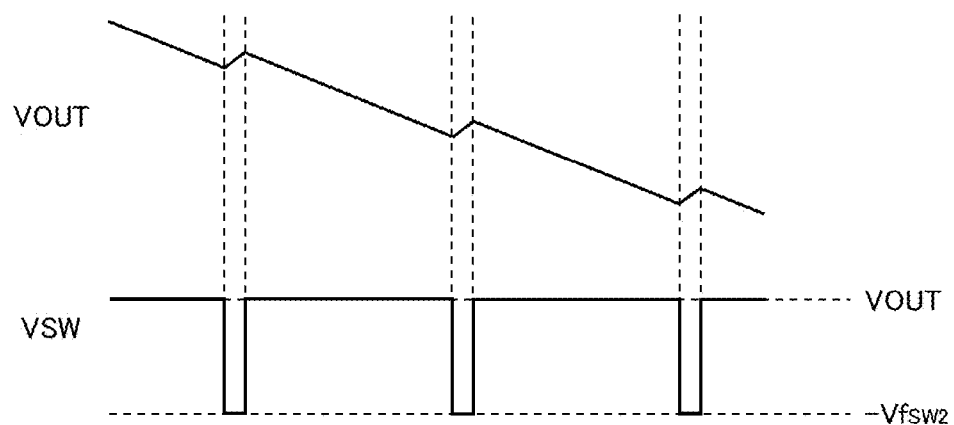
FIG. 28 is waveform diagrams of the output voltage and the switching voltage (the third control pattern)

When the inductor current IL is in the positive direction, the output voltage VOUT and the switching voltage VSW in the second state STATE2 are as shown in FIG. 28. Here, the scale of the output voltage VOUT in the vertical direction on the plane of FIG. 28 is enlarged with respect to the switching voltage VSW. As is understood from FIG. 28, the period of the switching voltage VSW is a fixed period Tfix. That is, the frequency (switching frequency) of the switching voltage VSW does not vary; thus the frequency of noise ascribable to the switching frequency does not vary either. Thus, there is no risk of reducing the effect of the noise suppressing means (for example, a filter circuit) for suppressing noise of a fixed frequency.

Next, a description will be given of a case where the inductor current IL is in the negative direction.

Figure 29:
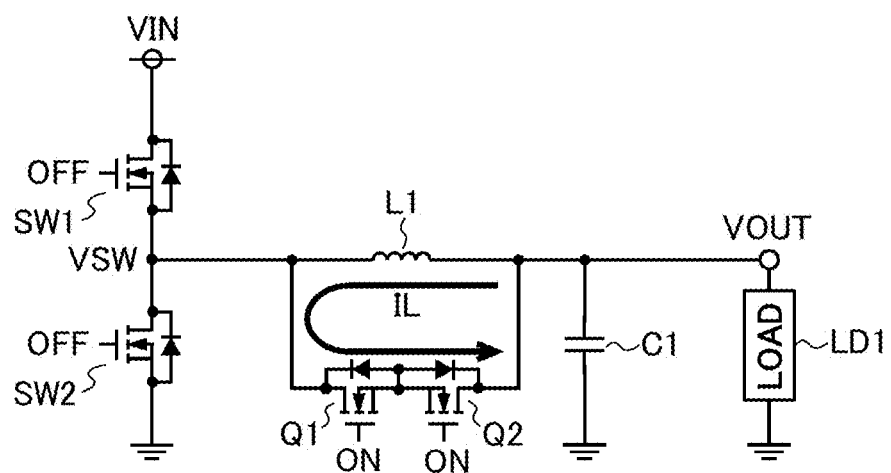
FIG. 29 is a diagram showing how the inductor current is regenerated (the third control pattern)

In the state STATE2-1, as shown in FIG. 29, the N-channel MOS transistors Q1 and Q2 are kept on; thus, the inductor current IL is regenerated in a closed circuit including the inductor L1 and the N-channel MOS transistors Q1 and Q2, and the switching voltage VSW is substantially equal to the output voltage VOUT.

In the state STATE2-1, it is possible to cut off the supply of current toward the load LD1. Moreover, in the state STATE2-1, since the first and second switches SW1 and SW2 are both off, the output voltage VOUT can be clamped around the level at the occurrence of an overshoot. That is, by keeping the first and second switches SW1 and SW2 off and the N-channel MOS transistors Q1 and Q2 on when an overshoot occurs in the output voltage VOUT, it is possible to prevent the output voltage VOUT from increasing further, and thus to suppress an overshoot in the output voltage VOUT.

Figure 30:
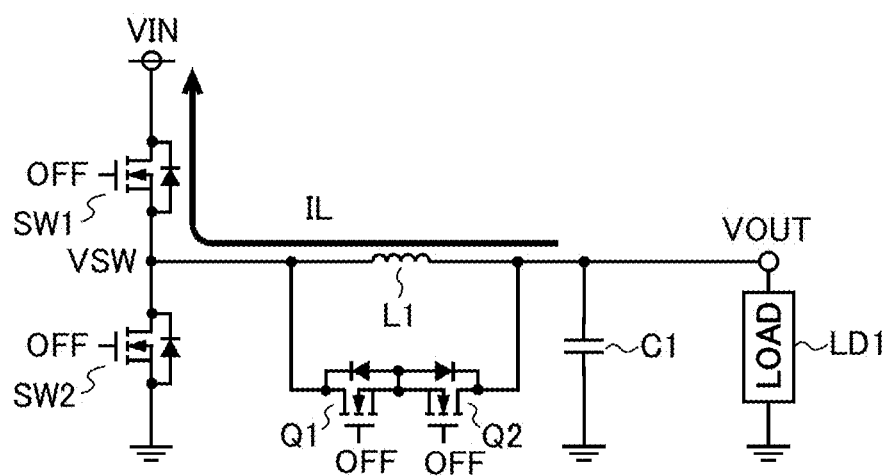
FIG. 30 is a diagram showing how the inductor current passes from the inductor via the body diode of the first switch toward the application terminal for the input voltage (the third control pattern)

In the state STATE2-2, as shown in FIG. 30, the N-channel MOS transistors Q1 and Q2 are off; thus the inductor current IL passes from the inductor L1 via the body diode of the first switch SW1 toward the application terminal for the input voltage VIN. Thus, the switching voltage VSW equals $VIN+VF_{SW1}$.

Figure 31:
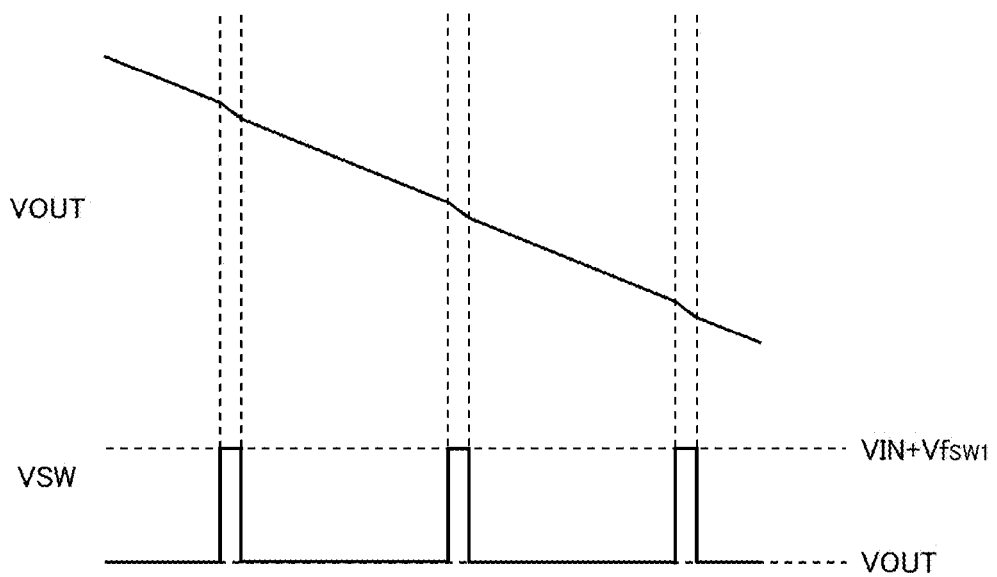
FIG. 31 is waveform diagrams of the output voltage and the switching voltage (the third control pattern)

When the inductor current IL is in the negative direction, the output voltage VOUT and the switching voltage VSW in the second state STATE2 are as shown in FIG. 31. Here, the scale of the output voltage VOUT in the vertical direction on the plane of FIG. 31 is enlarged with respect to the switching voltage VSW. As is understood from FIG. 31, the period of the switching voltage VSW is a fixed period Tfix. That is, the frequency (switching frequency) of the switching voltage VSW does not vary; thus the frequency of noise ascribable to the switching frequency does not vary either. Thus, there is no risk of reducing the effect of the noise suppressing means (for example, a filter circuit) for suppressing noise of a fixed frequency.

<Applications>

Figure 32:
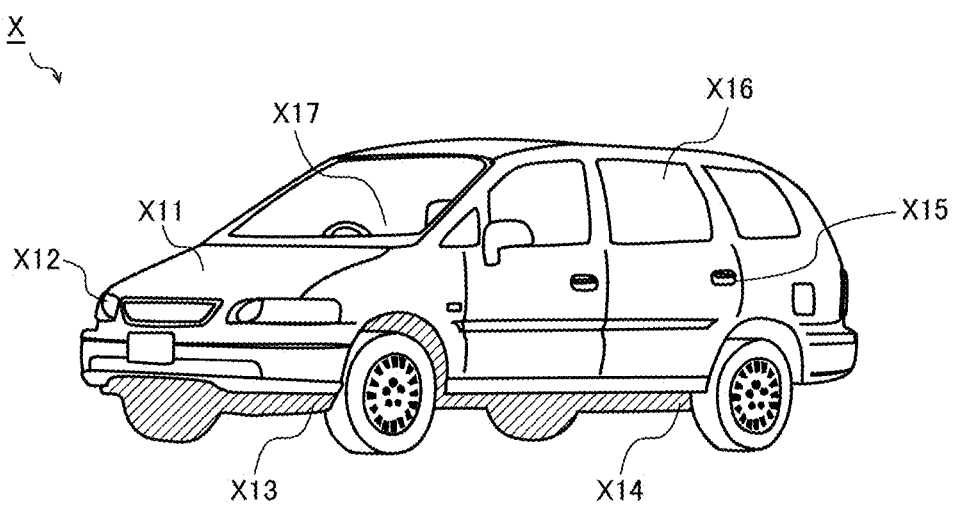
FIG. 32 is an exterior view showing one configuration example of a vehicle.
Figure 33:
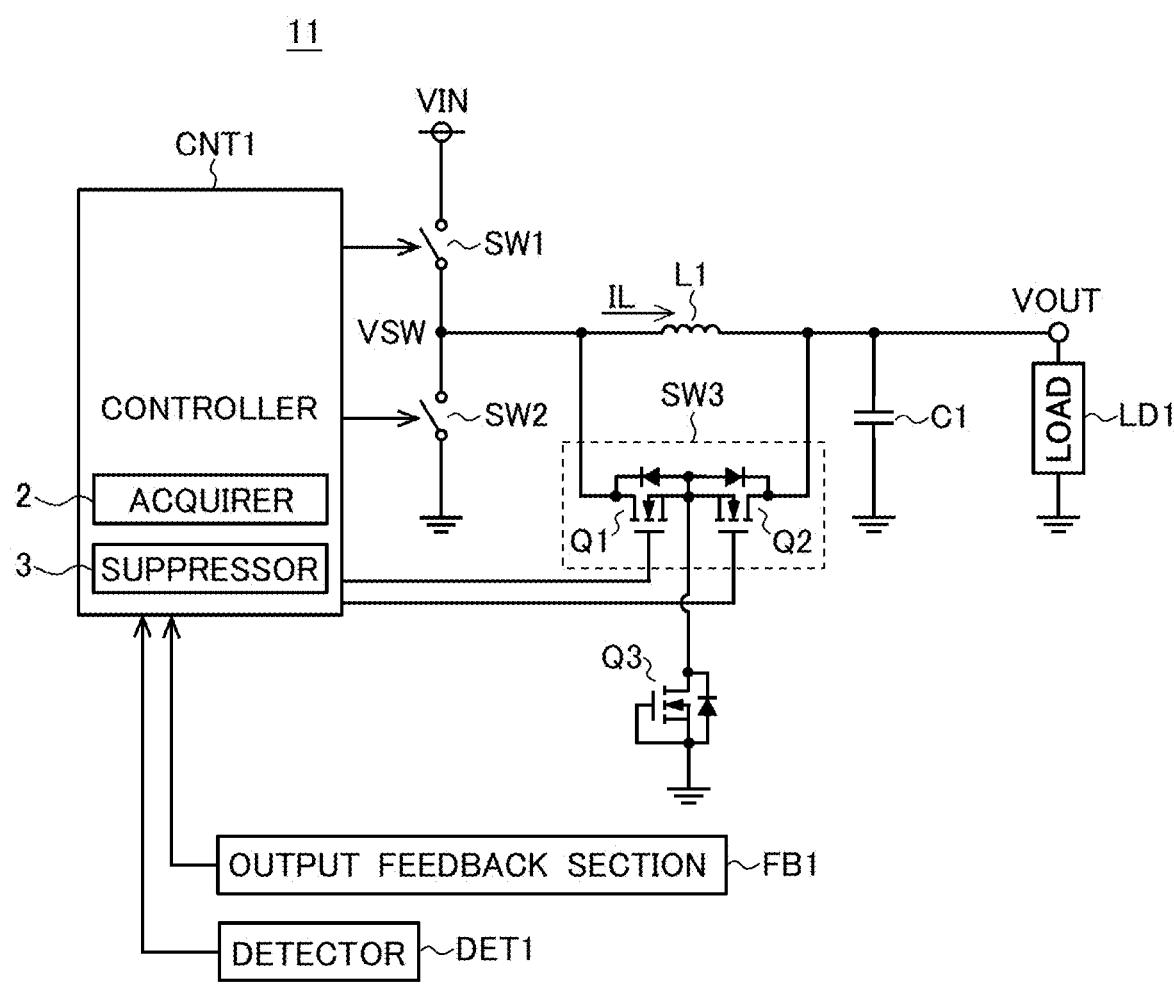
FIG. 33 is a diagram showing a modified example of the synchronous rectification switching power supply device according to the second configuration example.
Figure 34:
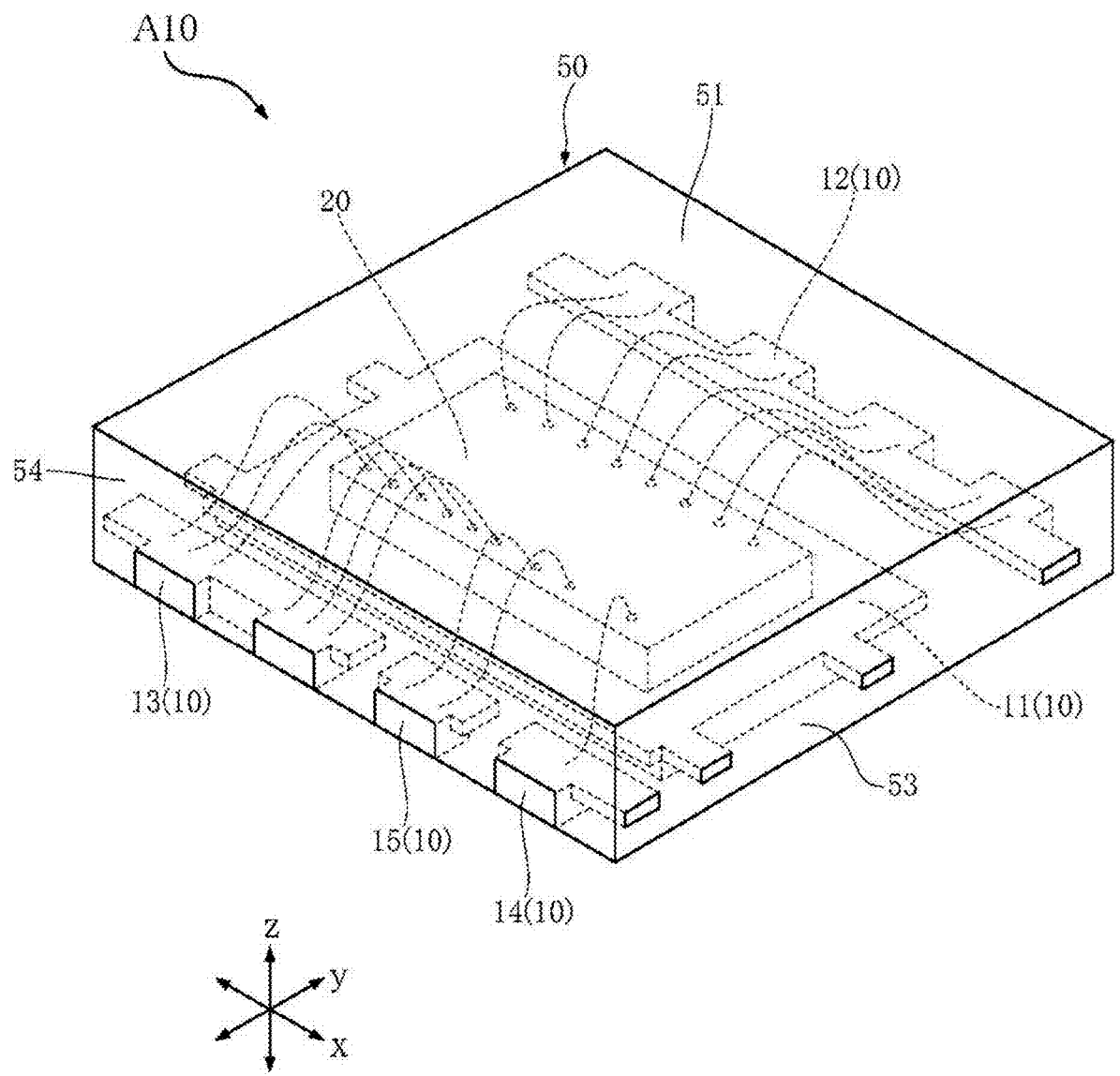
FIG. 34 is a perspective view of a semiconductor device.

Next, an example of application of the switching power supply devices 1 and 11 described previously will be described. FIG. 32 is an exterior view showing an exemplary configuration of a vehicle incorporating vehicle-mounted appliances. The vehicle X of this exemplary configuration incorporates vehicle-mounted appliances X11 to X17 and a battery (not shown) that feeds electric power to the vehicle-mounted appliances X11 to X17.

The vehicle-mounted appliance X11 is an engine control unit that performs control related to the engine (such as the control of injection, electronic throttling, idling, an oxygen sensor heater, and automatic cruising).

The vehicle-mounted appliance X12 is a lamp control unit that controls turning on/off of HIDs (high-intensity discharge lamps) and DRLs (daytime running lamps).

The vehicle-mounted appliance X13 is a transmission control unit that performs control related to transmission.

The vehicle-mounted appliance X14 is a body control unit that performs control related to the movement of the vehicle X (such as the control of an ABS (anti-lock braking system), EPS (electric power steering), and electronic suspension).

The vehicle-mounted appliance X15 is a security control unit that controls the driving of door locks, burglar alarms, and the like.

The vehicle-mounted appliance X16 comprises electronic appliances incorporated in the vehicle X as standard or manufacturer-fitted equipment at the stage of factory shipment, such as wipers, power side mirrors, power windows, a power sun roof, power seats, and an air conditioner.

The vehicle-mounted appliance X17 comprises electronic appliances fitted to the vehicle X optionally as user-fitted equipment, such as vehicle mounted AV (audio-visual) equipment, a car navigation system, and an ETC (electronic toll collection system).

The switching power supply devices 1 and 11 described previously can be incorporated into any of the vehicle-mounted appliances X11 to X17.

<Notes>

The present invention can be implemented in any manner other than as in the embodiments described above, with any modifications made within the spirit of the present invention. The embodiments disclosed herein should be considered to be in every aspect illustrative and not restrictive, and the technical scope of the present invention is defined not by the description of embodiments given above but by the scope of the appended claims and should be understood to encompass any modifications within a sense and scope equivalent to the claims.

In the second operation example described above, for example, when the inductor current IL is in the positive direction, the controller CNT1 may keep the second switch SW2 on in the state STATE2-2. Or, for example, when the inductor current IL is in the negative direction, the controller CNT1 may keep the first switch SW1 on in the state STATE2-2.

In the second operation example described above, for example, the set value for the fixed period Tfix may be variable. By changing the period of the periodic signal S1, it is possible to change the set value for the fixed period Tfix.

In the operation example of the switching power supply device 1' described above, for example, when the inductor current IL is in the positive direction in the second or third control pattern, the controller CNT1 may keep the second switch SW2 on in the state STATE2-2. Or, for example, when the inductor current IL is in the negative direction in the first or third control pattern, the controller CNT1 may keep the first switch SW1 on in the state STATE2-2.

In the operation example of the switching power supply device 1' described above, for example, the set value for the fixed period Tfix may be variable. By changing the period of the periodic signal S1, it is possible to change the set value for the fixed period Tfix.

In the switching power supply device 1' described above, it is preferable that a clamper be provided that clamps the voltage at the connection node between the first and second switching elements described above within a predetermined range. For example, in the modified example shown in FIG. 33, the body diode of the N-channel MOS transistor Q3 is used as the clamper mentioned above. The drain of the N-channel MOS transistor Q3 is connected to the connection node between the N-channel MOS transistor Q1 used as the first switching element and the N-channel MOS transistor Q2 used as the second switching element. The gate and the source of the N-channel MOS transistor Q3 is connected to the ground potential. In the modified example shown in FIG. 33, the lower limit value of the voltage at the connection node between the N-channel MOS transistors Q1 and Q2 equals the value resulting from subtracting the forward voltages across the body diode of the N-channel MOS transistor Q3 from the ground potential. In the modified example shown in FIG. 33, the upper limit value of the voltage at the connection node between the N-channel MOS transistors Q1 and Q2 equals the avalanche breakdown voltage of the body diode of the N-channel MOS transistor Q3.

The present disclosure finds application in bucking switching power supply devices used in any fields (in the fields of home electrical appliances, automobiles, industrial machinery, and so on).

The controller CNT1 is incorporated in, for example, a semiconductor device A10. The semiconductor device A10 may include the detector DET1. Or, the semiconductor device A10 may include at least one of switches SW1 to SW3. Each of FIGS. 34 to 43 referred to below is schematically drawn. Further, each of FIGS. 34 to 43 referred to below may include portions that are omitted and portions that are exaggerated.

Figure 35:
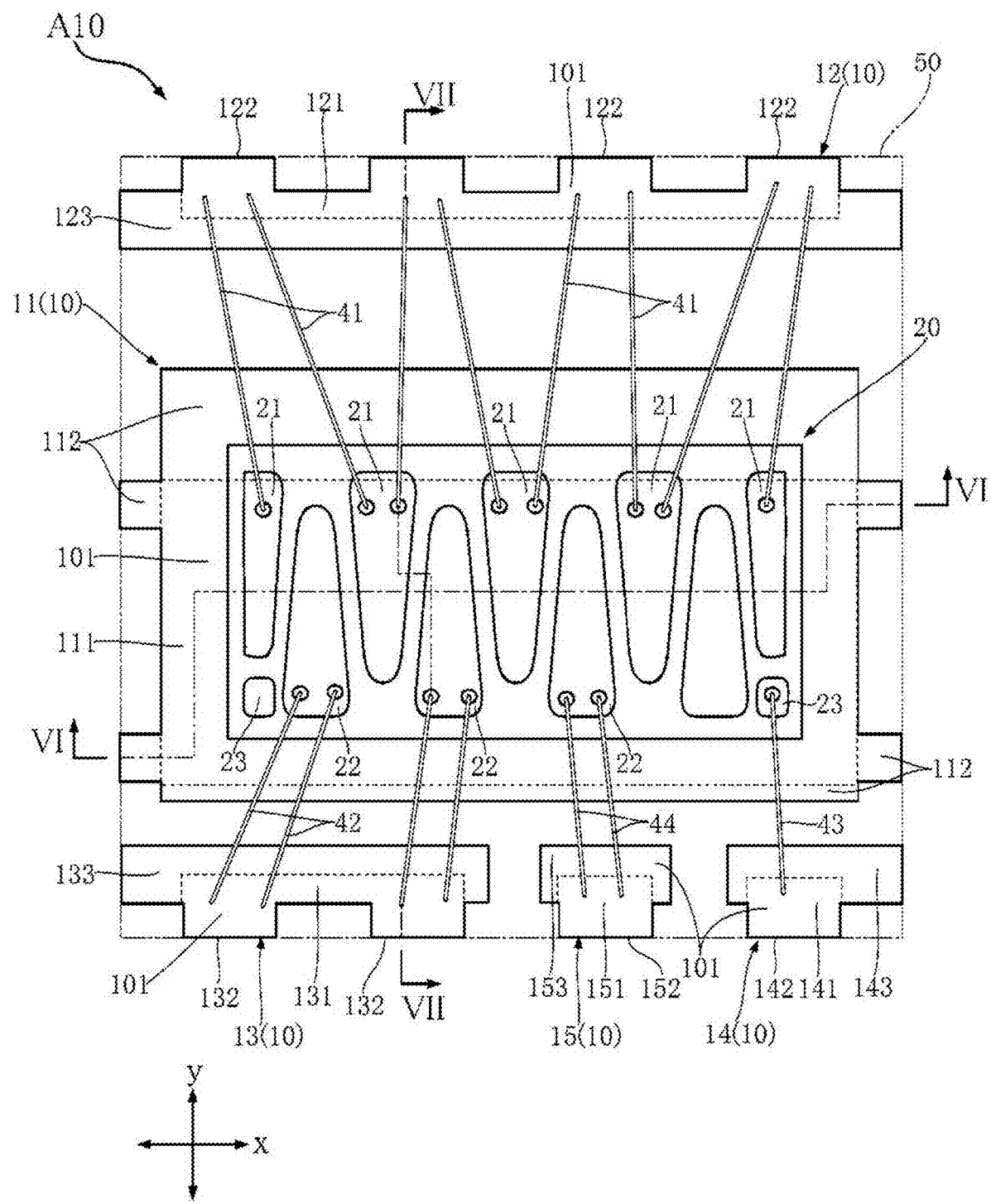
FIG. 35 is a plan view of the semiconductor device shown in FIG. 34, as seen through sealing resin.

With reference to FIGS. 34 to 42, the semiconductor device A10 will be described. The semiconductor device A10 includes a conductive member 10, a semiconductor element 20, a joining layer 30, a plurality of first wires 41, a plurality of second wires 42, a third wire 43, a plurality of fourth wires 44, and a sealing member 50. Here, in FIG. 35, the sealing resin 50 is seen through for convenience of understanding. In FIG. 35, the transmitted sealing resin 50 is indicated by an imaginary line (two dot chain line). Further, in FIG. 35, each of the line VI-VI and the line VII-VII is indicated by a one dot chain line.

In the description of the semiconductor element A10, the thickness-wise direction of the conductive member 10 is referred to as a "thickness-wise direction z". A direction orthogonal to the thickness direction z is referred to as a "first direction x". A direction orthogonal to both the thickness direction z and the first direction x is referred to as a "second direction y".

The conductive member 10 forms a conductive path between the semiconductor element 20 and the circuit substrate on which the semiconductor element 20 is mounted and the A10 is mounted. As shown in FIG. 35, the conductive member 10 includes a die pad 11, a first terminal 12, a second terminal 13, a third terminal 14, and a fourth terminal 15. These are composed of the same lead frame. The lead frame is made of copper (Cu) or a copper alloy. Therefore, the composition of the conductive member 10 includes copper. The conductive member 10 has a main surface 101 and a back surface 102. The main surface 101 faces the thickness direction z. The main surface 101 is covered with the sealing resin 50. A metal plating layer (not illustrated) such as a nickel (Ni) plating layer or a silver (Ag) plating layer may be laminated on the main surface 101 (in particular, a region in contact with the bonding layer 30 or a region to which wires such as the plurality of first wires 41 are bonded). The back surface 102 faces a side opposite to the main surface 101 in the thickness direction z. The back surface 102 is exposed from the sealing resin 50.

As shown in FIG. 35, the semiconductor element 20 is mounted on the die pad 11. The die pad 11 includes a base portion 111 and a protruding portion 112. The base portion 111 includes a main surface 101 and a back surface 102, and is a portion interposed between the main surface 101 and the back surface 102 in the thickness direction z. The overhanging portion 112 is an eaves-like portion overhanging from the base portion 111 in a direction orthogonal to the thickness direction z. The overhanging portion 112 includes a main surface 101. The main surface 101 of the protruding portion 112 is flush with the main surface 101 of the base portion 111. The protruding portion 112 is sandwiched by the sealing resin 50 in the thickness direction z.

As shown in FIG. 35, the first terminal 12 is located on one side in the second direction y with respect to the die pad 11. The first terminal 12 includes a base portion 121, a plurality of terminal side surfaces 122, and a protruding portion 123. The base portion 121 includes a main surface 101 and a back surface 102, and is a portion interposed between the main surface 101 and the back surface 102 in the thickness direction z. Each of the plurality of terminal side surfaces 122 is connected to the main surface 101 and the back surface 102, and is included in the base portion 121. Each of the plurality of terminal side surfaces 122 faces the second direction y. The overhanging portion 123 is an caves-like portion overhanging from the base portion 121 in a direction orthogonal to the thickness direction z. The overhanging portion 123 includes a main surface 101. The main surface 101 of the protruding portion 123 is flush with the main surface 101 of the base portion 121. The protruding portion 123 is sandwiched by the sealing resin 50 in the thickness direction z.

As shown in FIG. 35, the second terminal 13 is located opposite to the first terminal 12 with respect to the die pad 11 in the second direction y. The second terminal 13 includes a base portion 131, a plurality of terminal side surfaces 132, and a protruding portion 133. The base portion 131 includes a main surface 101 and a back surface 102, and is a portion interposed between the main surface 101 and the back surface 102 in the thickness direction z. Each of the plurality of terminal side surfaces 132 is connected to the main surface 101 and the back surface 102, and is included in the base portion 131. Each of the plurality of terminal side surfaces 132 faces the second direction y. The overhanging portion 133 is an caves-like portion overhanging from the base portion 131 in a direction orthogonal to the thickness direction z. The overhanging portion 133 includes a main surface 101. The main surface 101 of the protruding portion 133 is flush with the main surface 101 of the base portion 131. The protruding portion 133 is sandwiched by the sealing resin 50 in the thickness direction z.

As shown in FIG. 35, the third terminal 14 is located opposite to the first terminal 12 with respect to the die pad 11 in the second direction y. The third terminal 14 includes a base portion 141, a terminal side surface 142, and a protruding portion 143. The base portion 141 includes a main surface 101 and a back surface 102, and is a portion interposed between the main surface 101 and the back surface 102 in the thickness direction z. The terminal side surface 142 is connected to the main surface 101 and the back surface 102, and is included in the base portion 141. The terminal side surface 142 faces the second direction y. The overhanging portion 143 is an caves-like portion overhanging from the base portion 141 in a direction orthogonal to the thickness direction z. The overhanging portion 143 includes a main surface 101. The main surface 101 of the protruding portion 143 is flush with the main surface 101 of the base portion 141. The protruding portion 143 is sandwiched by the sealing resin 50 in the thickness direction z.

As shown in FIG. 35, the fourth terminal 15 is located opposite to the first terminal 12 with respect to the die pad 11 in the second direction y, and is located between the second terminal 13 and the third terminal 14 in the first direction x. The fourth terminal 15 includes a base portion 151, a terminal side surface 152, and an overhanging portion 153. The base portion 151 includes a main surface 101 and a back surface 102, and is a portion interposed between the main surface 101 and the back surface 102 in the thickness direction z. The terminal side surface 152 is connected to the main surface 101 and the back surface 102, and is included in the base portion 151. The terminal side surface 152 faces the second direction y. The overhanging portion 153 is an eaves-like portion overhanging from the base portion 151 in a direction orthogonal to the thickness direction z. The overhanging portion 153 includes a main surface 101. The main surface 101 of the protruding portion 153 is flush with the main surface 101 of the base portion 151. The protruding portion 153 is sandwiched by the sealing resin 50 in the thickness direction z.

Figure 39:
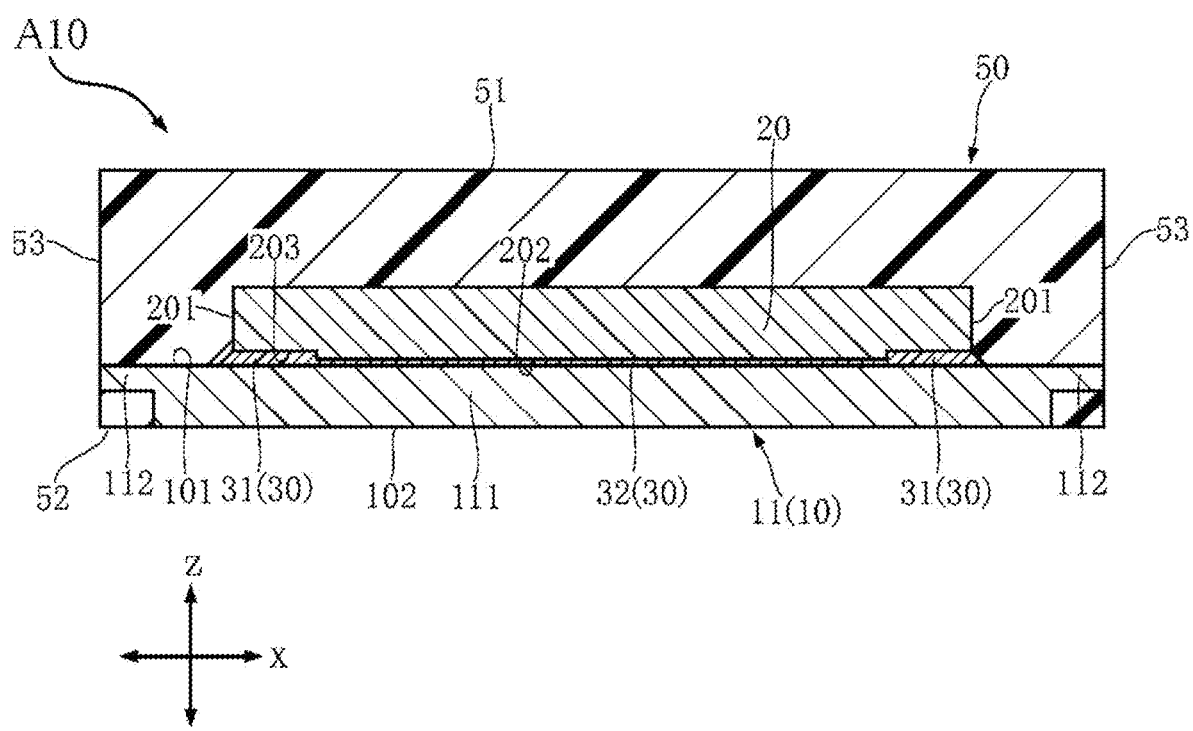
FIG. 39 is a sectional view along line VI-VI in FIG. 35.
Figure 40:
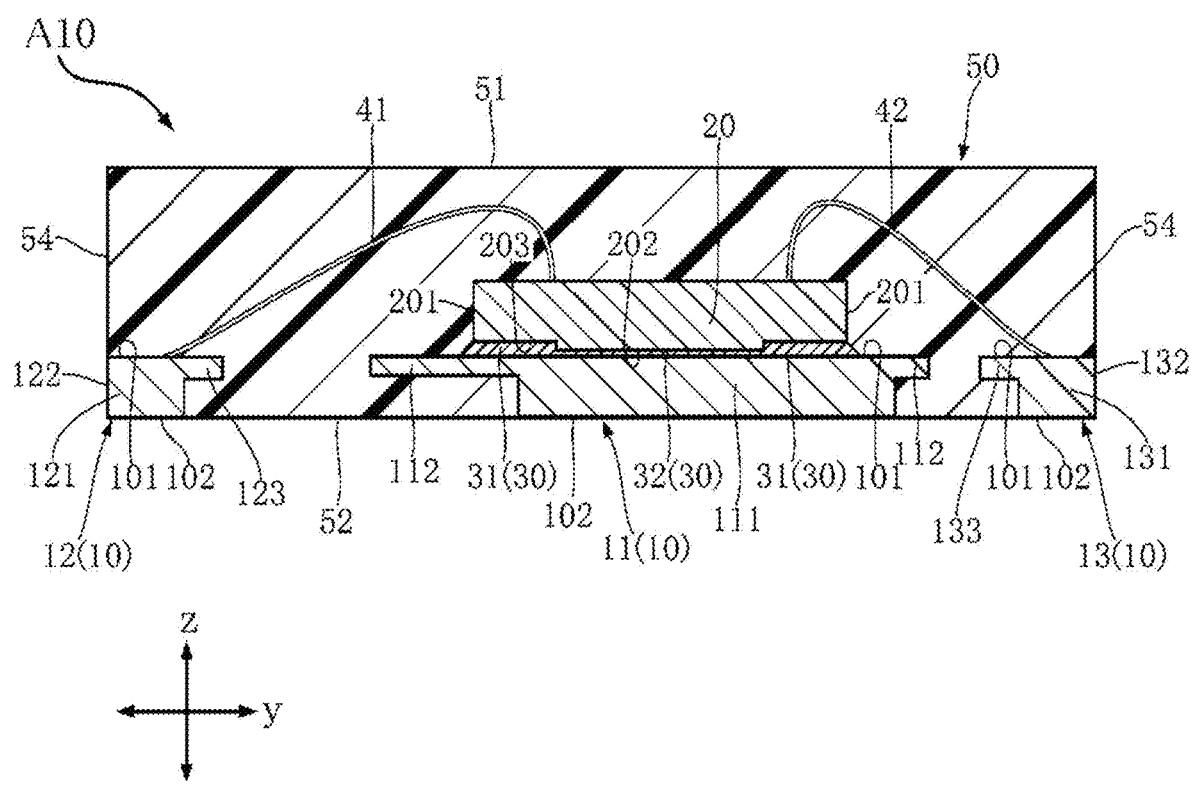
FIG. 40 is a sectional view along line VII-VII in FIG. 36.

As shown in FIGS. 35, 39 and 40, the semiconductor element 20 is mounted on the main surface 101 of the die pad 11. The number of semiconductor elements 20 may be one, or two or more. The semiconductor element 20 may be, for example, the switch SW1. Or, the semiconductor element 20 may be, for example, the switch SW2. Or, the semiconductor element 20 may be, for example, the switch SW3. The semiconductor element 20 is a transistor (switching element) mainly used for power conversion. The semiconductor element 20 is made of a material including a nitride semiconductor. In the device A10, the semiconductor element 20 is a HEMT (High Electron Mobility Transistor: High-Electron Mobility Transistor) made of a material including gallium nitride (GaN). The semiconductor element 20 includes an end surface 201, a plurality of first electrodes 21, a plurality of second electrodes 22, a third electrode 23, a substrate 24, a buffer layer 25, a first semiconductor layer 261, a second semiconductor layer 262, a plurality of third semiconductor layers 263, a passivation film 27, and a metal layer 28.

Figure 42:
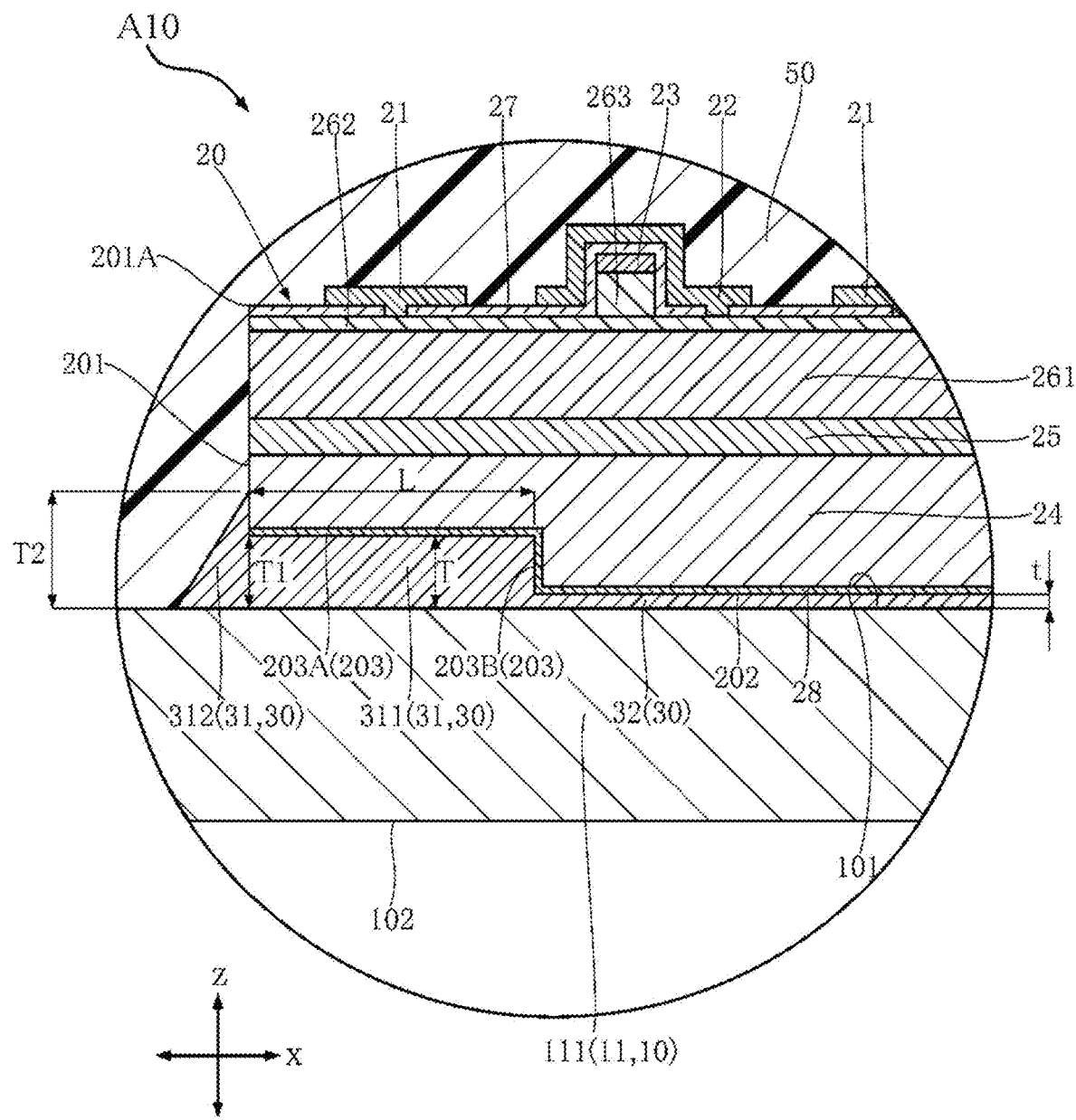
FIG. 42 is an enlarged part view of FIG. 39.

As shown in FIG. 42, the end surface 201 faces in a direction orthogonal to the thickness direction z. Z. An end of the end surface 201 farthest from the main surface 101 of the die pad 11 corresponds to the peripheral edge 201A of the semiconductor chip 20. The peripheral edge 201A has a rectangular shape when viewed along the thickness-wise direction Z.

As shown in FIG. 42, the substrate 24 forms a base of the semiconductor element 20. The composition of the substrate 24 includes silicon (Si). The thickness of the substrate 24 is, for example, 400 μm or more and 600 μm or less. The buffer layer 25 is composed of a plurality of nitride compound layers formed on the substrate 24. In the device A10, the buffer layer 25 includes a first buffer layer made of an aluminum nitride (AlN) film in contact with the substrate 24 and a second buffer layer made of a gallium aluminum nitride (AlGaN) film stacked on the first buffer layer.

As shown in FIG. 42, the first semiconductor layer 261 is stacked on the buffer layer 25 by epitaxial growth. The first semiconductor layer 261 is formed of a gallium nitride layer. The first semiconductor layer 261 forms an electron transit layer in the semiconductor element 20. In the second semiconductor layer 262, the second semiconductor layer 262 is stacked on the first semiconductor layer 261 by epitaxial growth. The second semiconductor layer 262 is formed of a gallium aluminum nitride layer. The second semiconductor layer 262 serves as an electron supply layer in the semiconductor element 20. The total thickness of the buffer layer 25, the first semiconductor layer 261, and the second semiconductor layer 262 is about 2 μm. In the first semi-conductor layer 261, two dimensional electronic gas (2DEG) is generated in the vicinity of an interface with the second semiconductor layer 262. The two dimensional electron gas is used for a conduction path between the first semiconductor layer 261 and the second semiconductor layer 262.

As shown in FIG. 42, the plurality of third semiconductor layers 263 are stacked on the second semiconductor layer 262 by epitaxial growth. Each of the multiple third semiconductor layers 263 extends along the second direction y. The multiple third semiconductor layers 263 are arrayed along the first direction x. Each of the plurality of third semiconductor layers 263 is formed of a p-type gallium nitride layer. A portion of the third electrode 23 is formed on each of the plurality of third semiconductor layers 263. The third electrode 23 corresponds to a gate electrode of the semiconductor element 20. A voltage signal for driving the semiconductor element 20 is applied to the third electrode 23. The passivation film 27 covers the second semiconductor layer 262, the third semiconductor layer 263, and a portion of the third electrode 23. The passivation film 27 has electrical insulation properties. The passivation film 27 is made of, for example, silicone nitride (Si3N4).

Figure 41:
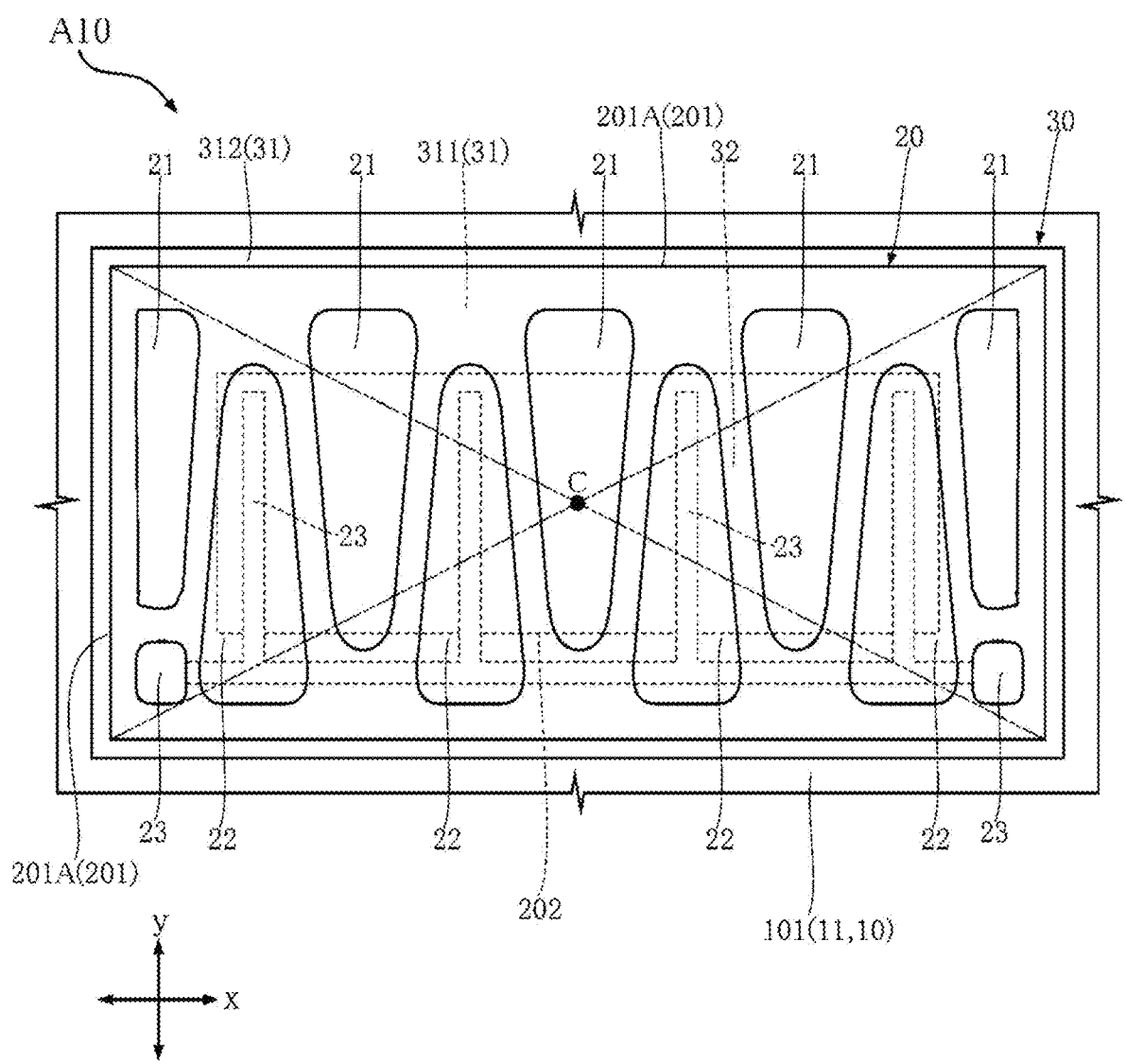
FIG. 41 is an enlarged part view of FIG. 35, showing only a conductive member, a semiconductor element, and a bonding layer.

As shown in FIG. 41, each of the multiple first electrodes 21 and the multiple second electrodes 22 extends along the second direction y. The plurality of first electrodes 21 and the plurality of second electrodes 22 are alternately arranged along the first direction x. As shown in FIG. 42, the plurality of first electrodes 21 are disposed on the passivation film 27 and electrically connected to the second semiconductor layer 262. Each of the plurality of first electrodes 21 corresponds to a drain electrode of the semiconductor element 20. Each of the plurality of second electrodes 22 is disposed on the passivation film 27 so as to straddle the third semiconductor layer 263 and a part of the third electrode 23, and is electrically connected to the second semiconductor layer 262. Each of the plurality of second electrodes 22 corresponds to a source electrode of the semiconductor element 20. As shown in FIG. 41, a part of the third electrode 23 is exposed from the passivation film 27. In the third electrode 23, a portion formed on each of the plurality of third semiconductor layers 263 and a portion exposed from the passivation film 27 are integrated. As shown in FIGS. 8 and 9, when viewed along the thickness direction z, the third electrode 23 overlaps a thin portion 32 (details will be described later) of the bonding layer 30.

As shown in FIG. 42, the metal layer 28 is positioned on the opposite side of the first semiconductor layer 261 with respect to the substrate 24 in the thickness direction z. The metal layer 28 covers the substrate 24. The composition of the metal layer 28 includes, for example, gold (Au). The metal layer 28 is formed by a sputtering method. In the device A10, the metallic layer 28 does not correspond to the electrodes of the semiconductor element 20.

The semiconductor element 20 switches a current flowing from the plurality of first electrodes 21 to the plurality of second electrodes 22 based on a voltage signal applied to the third electrode 23. Thereby, the power input from the plurality of first electrodes 21 is converted by the semiconductor element 20. The converted electric power is output from the plurality of second electrodes 22. The shape and the arrangement form of the plurality of first electrodes 21, the plurality of second electrodes 22, and the third electrode 23 in the semiconductor element 20 illustrated in FIG. 41 are merely an example, and are not limited thereto.

As shown in FIG. 42, in the device A10, the semiconductor element 20 has a convex surface 202 and an intermediate surface 203. The convex surface 202 and the intermediate surface 203 are included in the metal layer 28. The convex surface 202 is opposed to the main surface 101 of the die pad 11 and located closest to the main surface 101. As shown in FIG. 41, in the device A10, the convex surface 202 has a rectangular shape. Alternatively, convex surface 202 may have, for example, a circular shape. Z. When viewed along the thickness-wise direction z, the convex surface 202 overlaps the center C of the semiconductor device 20 (the intersection of diagonal lines in a plane defined by the peripheral edge 201A of the semiconductor device 20).

As shown in FIG. 42, the intermediate surface 203 is connected to the convex surface 202 and the end surface 201. When viewed along the thickness direction z, the intermediate surface 203 surrounds the convex surface 202. The intermediate surface 203 has a first region 203A and a second region 203B. The first region 203A faces the main surface 101 and is connected to the end surface 201. The second region 203B is connected to the first region 203A and the second region 203B. In the device A10, the second region 203B is perpendicular to the first region 203A and the convex surface 202. In addition, the second region 203B may be inclined with respect to each of the first region 203A and the convex surface 202.

The convex surface 202 and the intermediate surface 203 are obtained by removing a part of the substrate 24 of the semiconductor element 20 by reactive ion etching (RIE) or the like. Thus, in the device A10, the semiconductor element 20 is provided with a convex body defined by the convex surface 202 and the intermediate surface 203 and protruding toward the main surface 101.

As shown in FIGS. 39 and 40, the bonding layer 30 bonds the main surface 101 of the die pad 11 to the semiconductor element 20. The composition of the bonding layer 30 includes a metal element. The metal element includes tin (Sn). The bonding layer 30 is, for example, lead-free solder. As shown in FIGS. 41 and 42, the bonding layer 30 includes a thick portion 31 and a thin portion 32. The thick portion 31 overlaps with the peripheral edge 201A of the semiconductor chip 20 when viewed along the thickness-wise direction z. The thin portion 32 includes a portion located inward of the semiconductor element 20 with respect to the thick portion 31 when viewed along the thickness direction z. When viewed along the thickness direction z, the thin portion 32 overlaps the center C of the semiconductor element 20. Z. In the device A10, the thin portion 32 is entirely located inward of the thick portion 31 and surrounded by the thick portion 31. In the device A10, the position, shape, and size of the thin portion 32 are the same as the position, shape, and size of the convex surface 202 of the semiconductor element 20. Therefore, in the device A10, the thin portion 32 is interposed between the main surface 101 and the convex surface 202. The thickness t of the thin portion 32 is smaller than the thickness T of the thick portion 31.

In the device A10, as shown in FIG. 42, the convex surface 202 of the semiconductor element 20 is in contact with the thick portion 31. The intermediate surface 203 of the semiconductor element 20 is in contact with the thick portion 31.

As shown in FIGS. 41 and 42, the thick portion 31 includes a first portion 311 and a second portion 312. Z. The first portion 311 is located inward of the semiconductor chip 20 with respect to the peripheral edge 201A of the semiconductor chip 20. Z. The second portion 312 is located outward of the semiconductor device 20 with respect to the peripheral edge 201A. The cross-sectional area of the second portion 312 along a direction perpendicular to the thickness direction z gradually decreases from the main surface 101 of the die pad 11 toward the semiconductor element 20. Thus, the second portion 312 forms a fillet in the bonding layer 30. As shown in FIG. 42, the width T2 of the second portion 312 at the peripheral edge 201A is greater than the width T1 of the first portion 311 at the peripheral edge 201A. Thus, the second portion 312 is configured to climb up the end surface 201 of the semiconductor element 20. Further, as shown in FIG. 42, a length L (a minimum length in a direction perpendicular to the thickness-wise direction z) of the first portion 311 from the peripheral edge 201A to the second portion 312 is larger than the width T1 of the first portion 311.

As shown in FIG. 35, the plurality of first wires 41, the plurality of second wires 42, the third wire 43, and the plurality of fourth wires 44 form conduction paths between the first terminal 12, the second terminal 13, the third terminal 14, and the fourth terminal 15 and the semiconductor element 20. The composition of each of these wires includes aluminum. Alternatively, the composition of each of these wires may include copper or gold.

As shown in FIG. 35, the plurality of first wires 41 are bonded to the plurality of first electrodes 21 of the semiconductor element 20 and the main surface 101 of the first terminal 12. Thus, the first terminal 12 is electrically connected to the plurality of first electrodes 21. Therefore, in the device A10, the first terminals 12 serve as drain terminals to which electric power before being converted by the semiconductor element 20 is input.

As shown in FIG. 35, the plurality of second wires 42 are bonded to the plurality of second electrodes 22 of the semiconductor element 20 and the main surface 101 of the second terminal 13. Thus, the second terminal 13 is electrically connected to the plurality of second electrodes 22. Therefore, in the device A10, the second terminals 13 serve as source terminals from which electric power converted by the semiconductor element 20 is output.

As shown in FIG. 35, the third wire 43 is bonded to the third electrode 23 of the semiconductor element 20 and the main surface 101 of the third terminal 14. Thus, the third terminal 14 is electrically connected to the third electrode 23. Thus, in the device A10, the third terminals 14 serve as gate terminals for driving the semiconductor element 20.

As shown in FIG. 35, the plurality of fourth wires 44 are bonded to any one of the plurality of second electrodes 22 of the semiconductor element 20 and the main surface 101 of the fourth terminal 15. Thus, the fourth terminal 15 is electrically connected to one of the plurality of second electrodes 22. Therefore, in the semiconductor element 20, the fourth terminal 15 serves as a source sense terminal for detecting a current flowing through the plurality of second electrodes 22.

As shown in FIGS. 34 to 40, the sealing resin 50 covers the semiconductor element 20, the bonding layer 30, the plurality of first wires 41, the plurality of second wires 42, the third wire 43, and the plurality of fourth wires 44. Further, the sealing resin 50 covers a part of each of the die pad 11, the first terminal 12, the second terminal 13, the third terminal 14, and the fourth terminal 15. As shown in FIGS. 39 and 40, the sealing resin 50 is in contact with the main surface 101 of the conductive member 10. The sealing resin 50 has electrical insulation properties. The sealing resin 50 is made of, for example, a material containing a black epoxy resin. The sealing resin 50 has a top surface 51, a bottom surface 52, a pair of first side surfaces 53, and a pair of second side surfaces 54.

Figure 36:
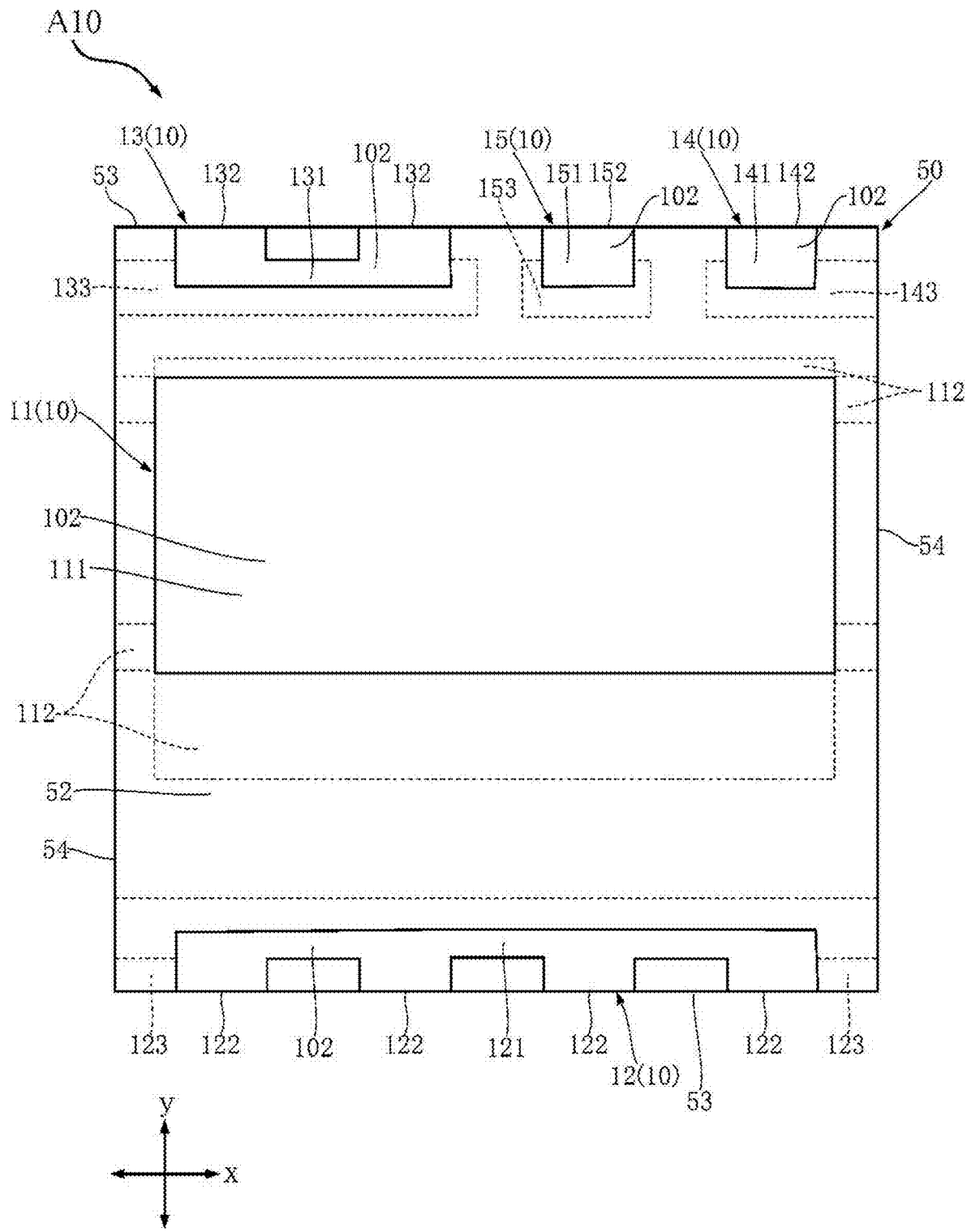
FIG. 36 is a bottom view of the semiconductor device shown in FIG. 34.

As shown in FIGS. 39 and 40, the top surface 51 faces the same side as the main surface 101 of the die pad 11 in the thickness direction z. As shown in FIGS. 39 and 40, the bottom surface 52 faces a side opposite to the top surface 51 in the thickness direction z. As shown in FIG. 36, the back surface 102 of the conductive member 10 is exposed from the bottom surface 52.

Figure 37:
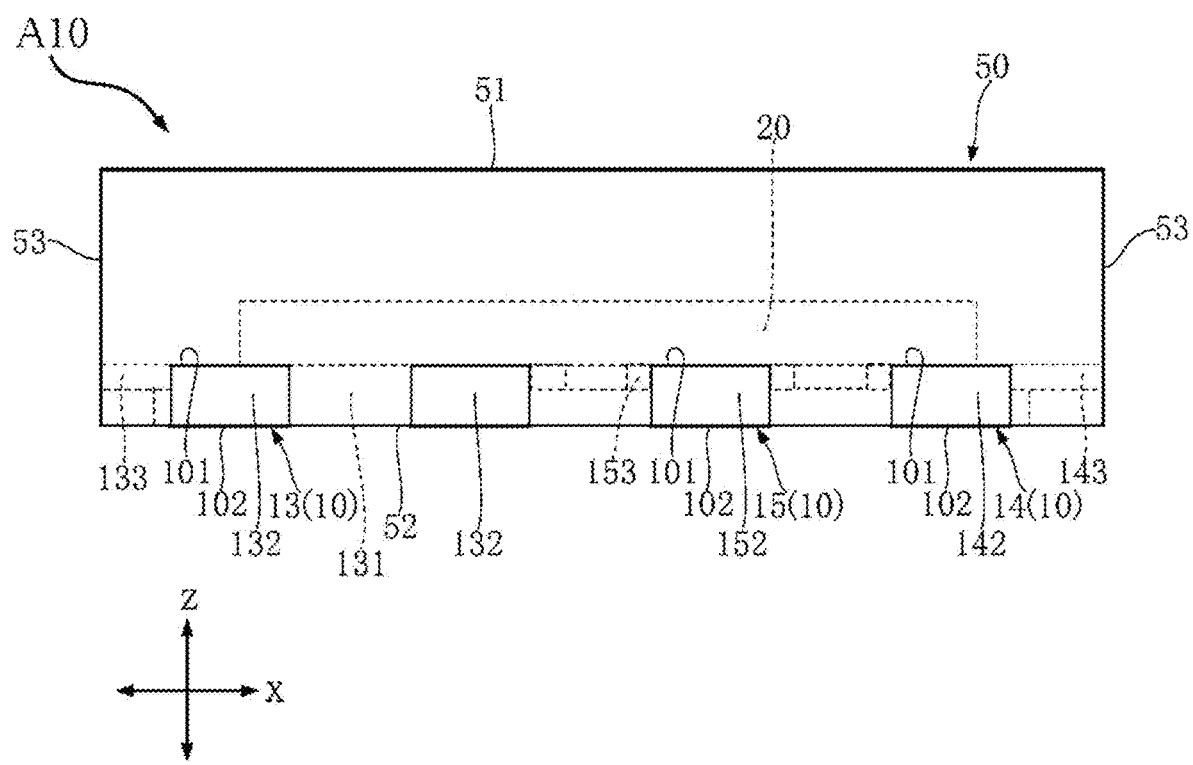
FIG. 37 is a front view of the semiconductor device shown in FIG. 34.
Figure 38:
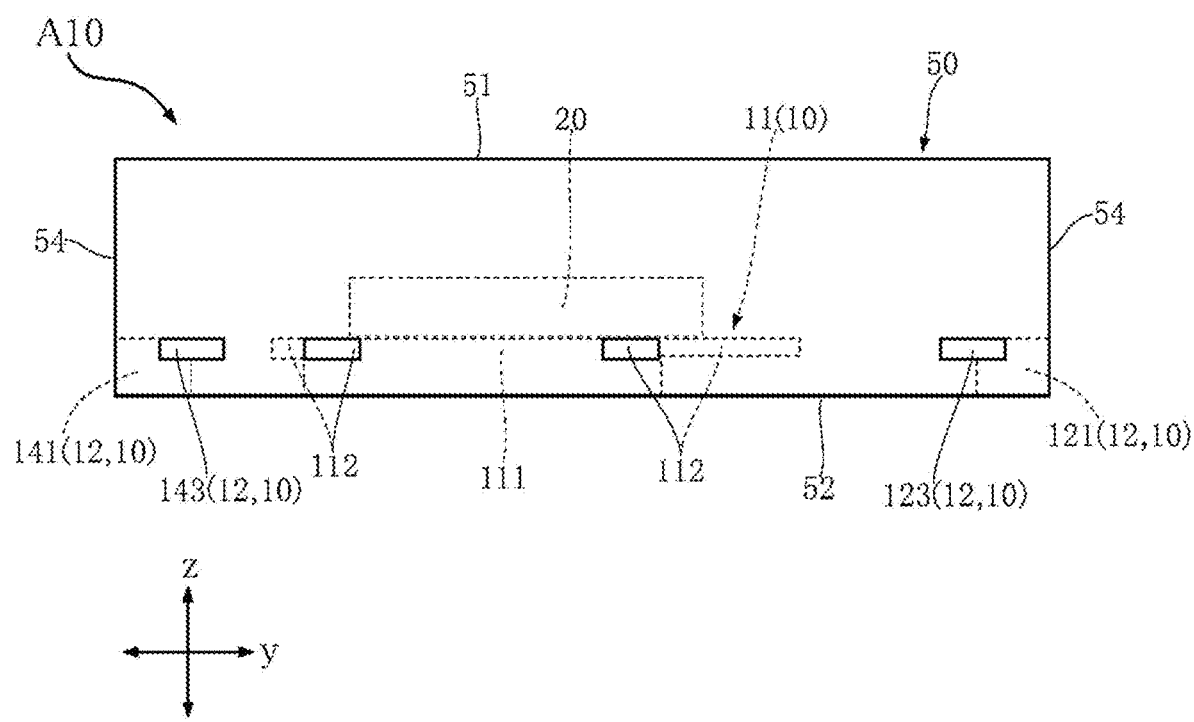
FIG. 38 is a right side view of the semiconductor device shown in FIG. 34.

As shown in FIGS. 37 to 39, the pair of first side surfaces 53 are spaced apart from each other in the first direction x. Each of the pair of first side surfaces 53 is connected to the top surface 51 and the bottom surface 52. As shown in FIGS. 38 and 39, a part of the protruding portion 112 of the die pad 11 is exposed from the pair of first side surfaces 53.

As shown in FIGS. 37, 38, and 40, the pair of second side surfaces 54 are spaced apart from each other in the second direction y. Each of the pair of second side surfaces 54 is connected to the top surface 51 and the bottom surface 52. As shown in FIG. 37, a plurality of terminal side surfaces 132 of the second terminal 13, a terminal side surface 142 of the third terminal 14, and a terminal side surface 152 of the fourth terminal 15 are exposed from one of the pair of second side surfaces 54. As shown in FIG. 39, the plurality of terminal side surfaces 122 of the first terminal 12 are exposed from the other second side surface 54 of the pair of second side surfaces 54.

Next, with reference to FIG. 43, as a modified example of the semiconductor element A10, a semiconductor element A11 will be described. Here, the cross-sectional position of FIG. 43 is the same as that of FIG. 42.

Figure 43:
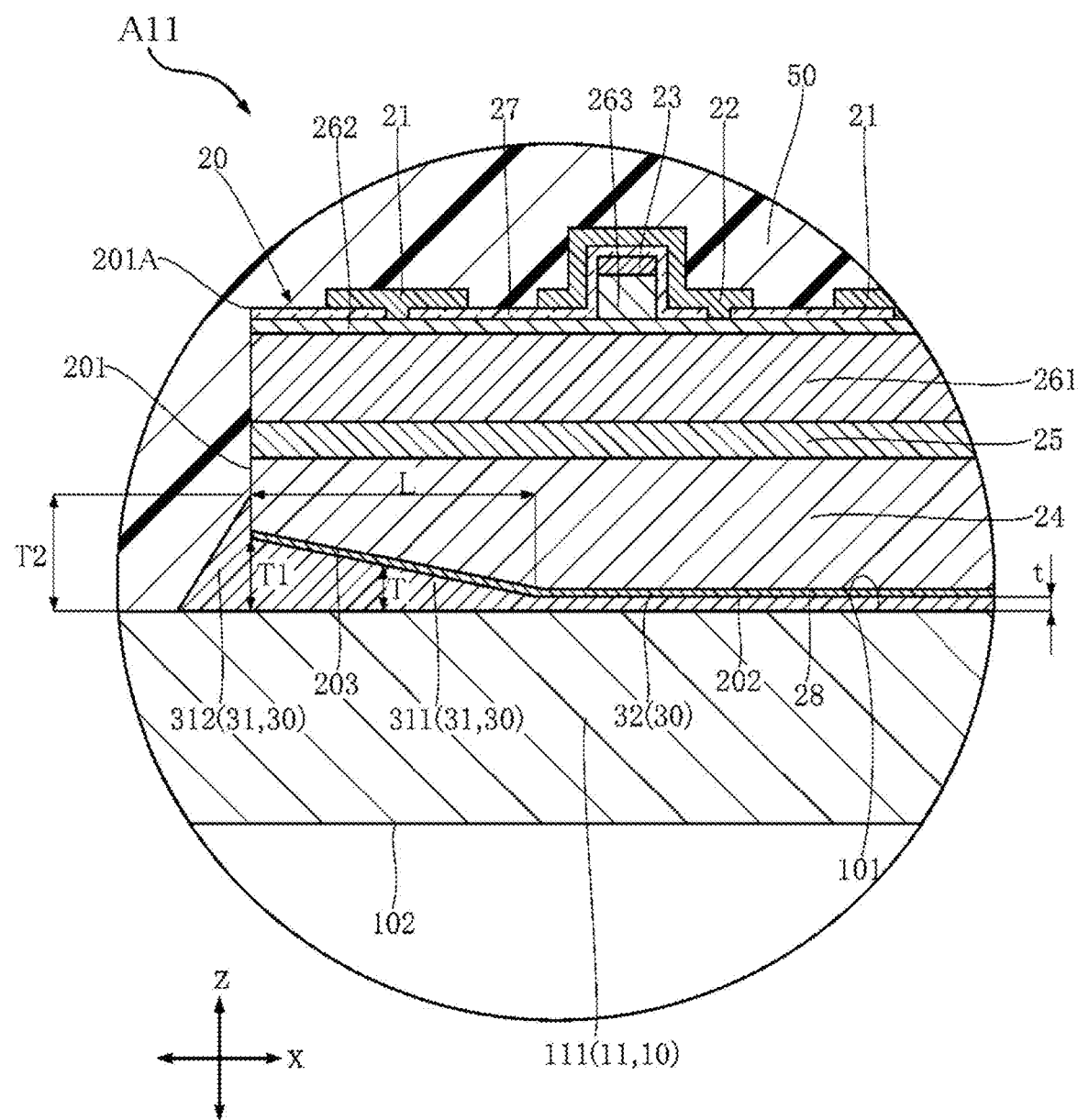
FIG. 43 is an enlarged part sectional view of a semiconductor device according to a modified example of an embodiment of the present disclosure.

As shown in FIG. 43, in the device A11, the configuration of the intermediate surface 203 of the semiconductor element 20 is different from that of the device A10. The intermediate surface 203 of the semiconductor element A11 is inclined with respect to each of the convex surface 202 and the end surface 201 of the semiconductor element 20. Thus, the thicknesses T of the thick portions 31 of the joining layer 30 become gradually smaller from the peripheral edge 201A of the semiconductor chip 20 toward the thin portions 32 of the joining layer 30. In the device A11, the intermediate surface 203 is a flat surface. Alternatively, the intermediate surface 203 may be a curved surface that bulges toward the outside of the semiconductor element 20 or a curved surface that is recessed toward the inside of the semiconductor element 20.

OVERVIEW

To follow is an overview of the present disclosure of which specific examples of implementation have been described by way of embodiments above.

According to one aspect of what is disclosed herein, a switching power supply device (1, 1') configured to buck an input voltage to an output voltage may include: a first switch (SW1) configured such that its first terminal is connectable to an application terminal for the input voltage, and that its second terminal is connectable to the first terminal of an inductor (L1); a second switch (SW2) configured such that its first terminal is connectable to the first terminal of the inductor and to the second terminal of the first switch, and that its second terminal is connectable to an application terminal for a voltage lower than the input voltage; a third switch (SW3) configured such that its first terminal is connectable to the first terminal of the inductor, to the second terminal of the first switch, and to the first terminal of the second switch, and that its second terminal is connectable to the second terminal of the inductor; a detector (DET1) configured to detect occurrence, or a sign of occurrence, of an overshoot in the output voltage; and a controller (CNT1) configured to turn on and off the first, second, and third switches. The controller may be configured to produce, after occurrence, or a sign of occurrence, of an overshoot in the output voltage is detected by the detector until the overshoot in the output voltage settles down, a control state in which the first and second switches are kept off and the third switch is kept on. The third switch is a GaN semiconductor element (Q6) (a first configuration).

In the switching power supply device according to the first configuration described above, the controller may be configured to turn the first and second switches off and the third switch on when the detector detects occurrence of, or a sign of occurrence of, an overshoot in the output voltage (a second configuration).

In the switching power supply device according to the second configuration described above, the detector may be configured to detect also settlement of an overshoot in the output voltage, and the controller may be configured to turn the third switch off when the detector detects settlement of an overshoot in the output voltage (a third structure).

In the switch power supply device according to the first configuration described above, the detector may be configured to detect also settlement of an overshoot in the output voltage, and the controller may be configured such that, in a period after the detector detects occurrence, or sign of occurrence, of an overshoot in the output voltage until the detector detects settlement of the overshoot in the output voltage, the controller keeps the first switch off when at least the third switch is on, keeps the second switch off when at least the third switch is on, and turns on and off the third switch at a fixed period (a fourth configuration).

In the switching power supply device according to the fourth configuration described above, in a period after the detector detects occurrence, or a sign of occurrence, of an overshoot in the output voltage until the detector detects settlement of the overshoot in the output voltage, an off-period of the third switch may have a fixed duration (a fifth configuration).

In the switching power supply device according to the fifth configuration described above, in a period after the detector detects occurrence, or a sign of occurrence, of an overshoot in the output voltage until the detector detects settlement of the overshoot in the output voltage, the duration of the off-period of the third switch may be equal to or shorter than one-tenth of the fixed period (a sixth configuration).

The switching power supply device according to any of the fourth to sixth configurations described above may be configured to generate a voltage of 1.8 MHz or higher but 2.1 MHz or lower at the connection node between the first and second switches (a seventh configuration).

In the switching power supply device according to any of the fourth to seventh configurations described above, the third switch may include a first switching element and a second switching element that are connected in series with each other (an eighth configuration).

In the switching power supply device according to the eighth configuration described above, in an on-period of the third switch, the first and second switching elements may be on, and, in the off-period of the third switch, the first switching element may be off and the second switching element may be on (a ninth configuration).

The switching power supply device according to the eighth or ninth configuration described above may further include a clamper configured to clamp a voltage at the connection node between the first and second switching elements within a predetermined range (a tenth configuration).

According to another aspect of what is disclosed herein, a switching control device (CNT1) may be configured to turn on and off a first switch (SW1) configured such that its first terminal is connectable to an application terminal for an input voltage and that its second terminal is connectable to the first terminal of an inductor (L1), a second switch (SW2) configured such that its first terminal is connectable to the first terminal of the inductor and to the second terminal of the first switch and that its second terminal is connectable to an application terminal for a voltage lower than the input voltage, and a third switch (SW3) being a GaN semiconductor element (Q6) and configured such that its first terminal is connectable to the first terminal of the inductor, to the second terminal of the first switch, and to the first terminal of the second switch and that its second terminal is connectable to the second terminal of the inductor. The switching control device may include an acquirer (2) configured to acquire a detection result from a detector for detecting occurrence, or sign of occurrence, of an overshoot in the output voltage, and a suppressor (3) configured to turn on and off the first, second, and third switches in accordance with the detection result acquired by the acquirer to suppress an overshoot in the output voltage by producing, after occurrence, or a sign of occurrence, of an overshoot in the output voltage is detected by the detector until the overshoot in the output voltage settles down, a control state in which the first and the second switches are kept off and the third switch is kept on (an eleventh configuration).

In the switching control device according to the eleventh configuration described above, the suppressor may be configured such that, when the detector detects occurrence, or a sign of occurrence, of an overshoot in the output voltage, the suppressor turns the first and second switches off and the third switch on to suppress the overshoot in the output voltage (a twelfth configuration).

In the switching control device according to the twelfth configuration described above, the detector may be configured to detect also settlement of an overshoot in the output voltage, and the suppressor may be configured to turn the third switch off when the detector detects settlement of an overshoot in the output voltage (a thirteenth configuration).

In the switching control device according to the eleventh configuration described above, the detector may be configured to detect also settlement of an overshoot in the output voltage, and the suppressor may be configured such that, in a period after the detector detects occurrence, or a sign of occurrence, of an overshoot in the output voltage until the detector detects settlement of the overshoot in the output voltage, the suppressor keeps the first switch off when at least the third switch is on, keeps the second switch off when at least the third switch is on, and turns on and off the third switch at a fixed period to suppress an overshoot in the output voltage (a fourteenth configuration).

In the switching control device according to the fourteenth configuration described above, in a period after the detector detects occurrence, or a sign of occurrence, of an overshoot in the output voltage until the detector detects settlement of the overshoot in the output voltage, the off-period of the third switch may have a fixed duration (a fifteenth configuration).

In the switching control device according to the fifteenth configuration described above, in a period after the detector detects occurrence, or a sign of occurrence, of an overshoot in the output voltage until the detector detects settlement of the overshoot in the output voltage, the duration of the off-period of the third switch may be equal to or shorter than one-tenth of the fixed period (a sixteenth configuration).

The switching control device according to any of the fourteenth to sixteenth configuration described above may be configured to generate a voltage of 1.8 MHz or higher but 2.1 MHz or lower at the connection node between the first and second switches (a seventeenth configuration).

In the switching control device according to any of the fourteenth to sixteenth configuration described above, the third switch may include a first switching element and a second switching element that are connected in series with each other (an eighteenth configuration).

In the switching control device according to the eighteenth configuration described above, in the on-period of the third switch, the first and second switching elements may be on, and, in the off-period of the third switch, the first switching element may be off and the second switching element may be on (a nineteenth configuration).

According to yet another aspect of what is disclosed herein, a vehicle-mounted appliance includes the switching power supply device according to any of the first to tenth configuration described above or the switching control device according to any of the eleventh to nineteenth configuration described above (a twentieth configuration).

According to yet another aspect of what is disclosed herein, a vehicle includes the vehicle-mounted appliance according to the twentieth configuration described above and a battery for supplying the vehicle-mounted appliance with electric power (a twenty first configuration).

The invention claimed is:

1. A switching power supply device configured to buck an input voltage to an output voltage, comprising:
   a first switch configured such that a first terminal thereof is connectable to an application terminal for the input voltage and that a second terminal thereof is connectable to a first terminal of an inductor;
   a second switch configured such that a first terminal thereof is connectable to the first terminal of the inductor and to the second terminal of the first switch, and that a second terminal thereof is connectable to an application terminal for a voltage lower than the input voltage;
   a third switch configured such that a first terminal thereof is connectable to the first terminal of the inductor, to the second terminal of the first switch, and to the first terminal of the second switch, and that a second terminal thereof is connectable to a second terminal of the inductor;

a detector configured to detect occurrence, or a sign of occurrence, of an overshoot in the output voltage when the output voltage exceeds a predetermined constant voltage; and a controller configured to turn on and off the first switch, the second switch, and the third switch, wherein the controller is configured to control states of the first switch, the second switch, and the third switch such that, in a first state where the first switch and the second switch are turned on and off complementarily at a fixed period, when a logic level of a detection signal output from the detector is switched, a transition is made to a second state where, while the first switch and the second switch are kept off, the third switch is turned on and off at the fixed period;

in the second state, when the logic level of the detection signal is switched, a transition is made to a third state where the first switch, the second switch, and the third switch are kept off; and in the third state, when, based on a periodic signal in which a pulse signal appears at the fixed period, the pulse signal appears, a transition is made to the first state.

2. The switching power supply device according to claim 1,
wherein
in a period after the detector detects occurrence, or a sign of occurrence, of an overshoot in the output voltage until the detector detects settlement of the overshoot in the output voltage, the duration of an off-period of the third switch is equal to or shorter than one-tenth of the fixed period.

3. The switching power supply device according to claim 1 configured to generate a voltage of 1.8 MHz or higher but 2.1 MHz or lower at a connection node between the first switch and the second switch.

4. The switching power supply device according to claim 1,
wherein
the third switch includes a first switching element and a second switching element that are connected in series with each other.

5. The switching power supply device according to claim 4,
wherein
in an on-period of the third switch, the first and second switching elements are on, and
in an off-period of the third switch, the first switching element is off and the second switching element is on.

6. The switching power supply device according to claim 4, further comprising a clamper provided between a connection node and a ground to clamp a voltage at the connection node within a predetermined range, wherein the connection node is between the first and second switching elements.

7. A vehicle-mounted appliance comprising the switching power supply device according to claim 1.

8. The switching power supply device according to claim 1, wherein the third switch is a GaN semiconductor element.

9. A switching control device configured to turn on and off a first switch configured such that a first terminal thereof is connectable to an application terminal for an input voltage, and that a second terminal thereof is connectable to a first terminal of an inductor, a second switch configured such that a first terminal thereof is connectable to the first terminal of the inductor and to the second terminal of the first switch, and that a second terminal thereof is connectable to an application terminal for a voltage lower than the input voltage, and a third switch being a GaN semiconductor element and configured such that a first terminal thereof is connectable to the first terminal of the inductor, to the second terminal of the first switch, and to the first terminal of the second switch, and that a second terminal thereof is connectable to a second terminal of the inductor, the switching control device comprising:
an acquirer configured to acquire a detection result from a detector for detecting occurrence, or sign of occurrence, of an overshoot in an output voltage when the output voltage exceeds a predetermined constant voltage; and
a suppressor configured to suppress an overshoot in the output voltage by controlling, according to the detection result acquired by the acquirer, states of the first switch, the second switch, and the third switch such that, in a first state where the first switch and the second switch are turned on and off complementarily at a fixed period, when a logic level of the detection result is switched, a transition is made to a second state where, while the first switch and the second switch are kept off, the third switch is turned on and off at the fixed period;

in the second state, when the logic level of the detection result is switched, a transition is made to a third state where the first switch, the second switch, and the third switch are kept off; and in the third state, when, based on a periodic signal in which a pulse signal appears at the fixed period, the pulse signal appears, a transition is made to the first state.

10. The switching control device according to claim 9,
wherein
in a period after the detector detects occurrence, or a sign of occurrence, of an overshoot in the output voltage until the detector detects settlement of the overshoot in the output voltage, the duration of an off-period of the third switch is equal to or shorter than one-tenth of the fixed period.

11. A switching control device according to claim 9, configured to generate a voltage of 1.8 MHz or higher but 2.1 MHz or lower at a connection node between the first switch and the second switch.

12. The switching control device according to claim 9,
wherein
the third switch includes a first switching element and a second switching element that are connected in series with each other.

13. The switching control device according to claim 12,
wherein
in an on-period of the third switch, the first and second switching elements are on, and
in an off-period of the third switch, the first switching element is off and the second switching element is on.

* * * * *